United States Patent
Kohno

(10) Patent No.: US 7,225,203 B2
(45) Date of Patent: May 29, 2007

(54) INFORMATION STORAGE SYSTEM AND INFORMATION MANAGEMENT SYSTEM

(75) Inventor: Akihiro Kohno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 10/117,635

(22) Filed: Apr. 5, 2002

(65) Prior Publication Data

US 2002/0147730 A1  Oct. 10, 2002

(30) Foreign Application Priority Data

Apr. 5, 2001 (JP) ............................. 2001-107573

(51) Int. Cl.
*G06F 7/00* (2006.01)
*H04N 5/92* (2006.01)

(52) U.S. Cl. .................. 707/104.1; 707/100; 707/102; 386/95; 386/125

(58) Field of Classification Search ................... 707/2, 707/3, 200, 6, 10, 100–104.1, 7, 104.11; 368/10, 21, 95; 324/357.13; 386/95, 125; 370/400
See application file for complete search history.

(56) References Cited

U.S. PATENT DOCUMENTS

| | | | | |
|---|---|---|---|---|
| 3,807,629 A | * | 4/1974 | Ishii et al. ................. | 235/89 R |
| 4,287,597 A | * | 9/1981 | Paynter et al. ............. | 455/12.1 |
| 4,316,272 A | * | 2/1982 | Naito .......................... | 368/21 |
| 5,528,558 A | * | 6/1996 | Mardhekar et al. ........... | 368/10 |
| 5,557,585 A | * | 9/1996 | Hanai et al. ................... | 368/10 |
| 5,619,274 A | * | 4/1997 | Roop et al. .................... | 725/39 |
| 5,661,526 A | * | 8/1997 | Hamamoto et al. ........... | 725/39 |
| 5,724,316 A | * | 3/1998 | Brunts .......................... | 368/10 |
| 5,842,146 A | * | 11/1998 | Shishido ..................... | 701/210 |
| 5,870,741 A | * | 2/1999 | Kawabe et al. ................. | 707/6 |
| 5,974,569 A | * | 10/1999 | Nickles ........................ | 714/38 |
| 6,233,204 B1 | * | 5/2001 | Chu et al. ..................... | 368/21 |
| 6,304,212 B1 | * | 10/2001 | Aoki et al. ............ | 342/357.13 |
| 6,442,547 B1 | * | 8/2002 | Bowman-Amuah .......... | 707/10 |
| 6,563,765 B1 | * | 5/2003 | Ishigaki ........................ | 368/47 |
| 6,643,661 B2 | * | 11/2003 | Polizzi et al. ............... | 707/100 |
| 6,647,370 B1 | * | 11/2003 | Fu et al. ......................... | 705/8 |
| 6,661,966 B1 | * | 12/2003 | Furuyama et al. ............ | 386/65 |
| 6,973,090 B2 | * | 12/2005 | Ofek et al. .................. | 370/400 |
| 2001/0024235 A1 | * | 9/2001 | Kinjo .......................... | 348/232 |
| 2002/0006269 A1 | * | 1/2002 | Kageyama et al. ........... | 386/95 |
| 2002/0025172 A1 | * | 2/2002 | Tsuda et al. ................... | 399/8 |
| 2002/0038234 A1 | * | 3/2002 | Fu et al. ........................ | 705/8 |

(Continued)

OTHER PUBLICATIONS

"What Are the U.S. Time Zones?"—U.S. Naval Observatory—1983.*

(Continued)

*Primary Examiner*—John Breene
*Assistant Examiner*—Anh Ly
(74) *Attorney, Agent, or Firm*—Morgan & Finnegan, LLP

(57) ABSTRACT

This invention provides a system for managing information in a format that can be used based on the international standard time and local time. Upon storing and managing information (150), a) the local time (121) of a predetermined area, b) a standard difference (122) as the difference between the international standard time and the standard time of the predetermined area, and c) a season difference (122) as the difference between the standard time and the local time of the predetermined area in a corresponding season are appended.

38 Claims, 21 Drawing Sheets

U.S. PATENT DOCUMENTS

| | | | |
|---|---|---|---|
| 2002/0044690 A1* | 4/2002 | Burgess | 382/209 |
| 2002/0122355 A1* | 9/2002 | Williams | 368/21 |
| 2003/0046670 A1* | 3/2003 | Marlow | 717/140 |
| 2003/0073428 A1* | 4/2003 | Yamamoto | 455/414 |
| 2004/0027480 A1* | 2/2004 | Hamamura | 348/371 |
| 2004/0203848 A1* | 10/2004 | Kumar | 455/433 |
| 2004/0218902 A1* | 11/2004 | Yanagita | 386/52 |
| 2004/0228619 A1* | 11/2004 | Kageyama et al. | 386/95 |
| 2006/0010501 A1* | 1/2006 | Borrowman | 726/27 |
| 2006/0122909 A1* | 6/2006 | Toshikage et al. | 705/26 |

OTHER PUBLICATIONS

"When Does Daylight Time Begin and End?"—U.S. Naval Observatory—1995.*

* cited by examiner

FIG. 9

| 121 | 122 | 123 | |
|---|---|---|---|
| NOVEMBER 1, 2000 12:00 | +9 : 00 | 0 : 00 | Filename170. info |
| NOVEMBER 1, 2000 12:00 | +1 : 35 | 0 : 20 | Filename171. info |
| ⋮ | | | ⋮ |
| JULY 20, 1999 19:00 | +4 : 00 | 1 : 00 | Filename17n. info |

| 121 | 122 | 123 | |
|---|---|---|---|
| JULY 20, 1999 19:00 | + 4 : 00 | 1 : 00 | Filename17n. info |
| ⋮ | | | ⋮ |
| NOVEMBER 1, 2000 12:00 | + 9 : 00 | 0 : 00 | Filename17o. info |
| NOVEMBER 1, 2000 12:00 | + 1 : 35 | 0 : 20 | Filename17l. info |

161

INFORMATION STORAGE SYSTEM AND INFORMATION MANAGEMENT SYSTEM

FIELD OF THE INVENTION

The present invention relates to the field of an information process and, more particularly, to an information storage system and method, an information management system and method, and a computer program for managing information on the basis of time.

BACKGROUND OF THE INVENTION

Upon saving main information such as documents, images, and the like, sub information as auxiliary information associated with the main information is often saved together with it. The sub information includes, for example, time information indicating the generation time of the main information. More specifically, when main information is a document, the generation time of that document is used; when main information is an image, the photographing time of that image is used.

Upon saving main information of a specific type for a long period of time, the time information as the sub information is important. This is because a method of displaying a list by time-serially sorting a plurality of pieces of main information, comparing a plurality of pieces of main information at the same time, and searching for desired main information based on time information is effective.

However, upon managing time information, time differences between countries or areas pose a problem. In ordinary life, local time is used but it is not internationally common. Furthermore, in a country or area that adopts the Daylight Saving Time (D.S.T.) system, the time differences among the international standard time, local time, and D.S.T. time differ depending on seasons.

For this reason, conventionally, as sub information the local time and information indicating if the local time is the D.S.T. time are saved together with main information, the local time or international standard time and information of a three-letter code indicating an area (city or the like) are stored together with main information, or the international standard time alone is simply saved together with main information. Conventionally, when main information is used, the sub information is converted into an international standard time or local time on the basis of such sub information and time zone information of a season specified by the sub information.

However, in order to manage time zone information used to convert sub information of every seasons into an international standard time or local time, considerable cost is required, and such organization, institution, or the like must be established.

Respective areas adopt various time operation systems. For example, a time system (e.g., D.S.T.) different from other years may be adopted in only a year in which the Olympic games are held, or D.S.T. may be adopted through several years irrespective of seasons due to political reasons during a war. Or countries or areas may be remapped due to revolution, independence, reform of laws, and the like, and a system that defines the local time may change accordingly. That is, the system which defines the local time may change for various reasons even in a single area, and even when the local time and area are specified, the local time cannot often be converted into an international standard time unless the time system of that season is considered. The same applies to a case wherein an international standard time is converted into the local time of a given area on the basis of the international standard time and area.

For example, upon sequentially extracting images that indicate count-down scenes of new years from a huge number of stored images, an image search is required on both the international standard times and local times. To meet such requirement, only time zone information of the photographing time is used.

As described above, according to the conventional method, time zone information used to convert sub information into an international standard time or local time must be permanently managed, and it is difficult to achieve consistent time management.

SUMMARY OF THE INVENTION

The present invention has been made in consideration of the above situation, and has as its object to provide a technique for managing information in a format that can be used based on the international standard time and local time.

According to the first aspect of the present invention, there is provided an information storage system comprising an acquisition unit arranged to acquire information, and a storage unit arranged to store the information acquired by the acquisition unit while appending, to the information, deficient information of a) a local time of a predetermined area including a location where the information is obtained, b) a standard difference as a difference between an international standard time and a standard time of the predetermined area, and c) a season difference as a difference between the standard time and a local time of the predetermined area in a corresponding season. In this way, since the information to be stored is stored together with a) the local time, b) the standard difference, and c) the season difference, the stored information can be used on the basis of the local time or international standard time.

According to a preferred embodiment of the present invention, the information storage system preferably further comprises an output unit arranged to output the information stored by the storage unit, i.e., the information appended with the local time, the standard time, and the season difference, for example, a saving unit arranged to save the information in a removable memory medium. With this arrangement, another apparatus or system can obtain the aforementioned advantages.

According to a preferred embodiment of the present invention, the information storage system preferably further comprises a search unit arranged to search the information stored by the storage unit for information which matches an arbitrary search condition. The search unit preferably includes a unit arranged to execute a search process for the information stored by the storage unit using a local time as a key. Also, the search unit preferably includes a unit arranged to execute a search process for the information stored by the storage unit using the international standard time as a key while calculating the international standard time on the basis of the local time, the standard difference, and the season difference. Furthermore, the information storage system preferably further comprises an output unit arranged to output the information retrieved by the search unit, for example, a saving unit arranged to save the information retrieved by the search unit in a removable memory medium.

According to a preferred embodiment of the present invention, the information storage system preferably further comprises a stored information manipulation unit arranged to manipulate the information stored by the storage unit on the basis of the local time appended to the information, for example, means arranged to sort the information stored by the storage unit on the basis of the local time.

According to a preferred embodiment of the present invention, the information storage system preferably further comprises a stored information manipulation unit arranged to manipulate the information stored by the storage unit on the basis of the international standard time while calculating the international standard time on the basis of the local time, the standard difference, and season difference appended to the information, for example, a unit arranged to sort the information stored by the storage unit on the basis of the international standard time.

According to a preferred embodiment of the present invention, the acquisition unit preferably includes a unit arranged to acquire information from a removable memory medium, and/or a unit arranged to acquire information from an external apparatus (e.g., a camera).

According to a preferred embodiment of the present invention, information acquired by the acquisition unit includes an image.

According to the second aspect of the present invention, there is provided an information storage system comprising an acquisition unit arranged to acquire information, and a storage unit arranged to store the information acquired by the acquisition unit while appending, to the information, deficient information of a) an international standard time, b) a standard difference as a difference between the international standard time and a standard time of a predetermined area including a location where the information is acquired, and c) a season difference as a difference between the standard time and a local time of the predetermined area in a corresponding season.

According to the third aspect of the present invention, there is provided an information management system comprising the information storage system according to the first aspect of the present invention, and an information collection system, and the information collection system comprising a collection/storage unit arranged to collect and store information stored by the storage unit of the information storage system from the information storage system.

According to a preferred embodiment of the present invention, the information collection system preferably further comprises a collected information search unit arranged to search the information collected and stored by the collection unit for information which matches an arbitrary search condition. The collected information search unit preferably includes a unit arranged to execute a search process for the information collected and stored by the collection unit using the local time as a key. Also, the collected information search unit preferably includes a unit arranged to execute a search process for the information collected and stored by the collection unit using the international standard time as a key while calculating the international standard time on the basis of the local time, the standard difference, and the season difference.

According to a preferred embodiment of the present invention, the information collection system preferably further comprises a unit arranged to output the information retrieved by the collected information search unit, for example, a unit arranged to save the information in a removable memory medium.

According to a preferred embodiment of the present invention, the information collection system preferably further comprises a collected information manipulation unit arranged to manipulate the information collected and stored by the collection/storage unit on the basis of the local time appended to the information, for example, a unit arranged to sort the information collected and stored by the collection/storage unit on the basis of the local time.

According to a preferred embodiment of the present invention, the information collection system preferably further comprises a collected information manipulation unit arranged to manipulate the information collected and stored by the collection/storage unit on the basis of the international standard time while calculating the international standard time on the basis of the local time, the standard difference, and season difference appended to the information, for example, a unit arranged to sort the information collected and stored by the collection/storage unit on the basis of the international standard time.

According to a preferred embodiment of the present invention, the information management system preferably comprises a plurality of information storage systems equivalent to the information storage system, and the collection/storage unit of the information collection system collects and stores information stored by the respective storage units of the plurality of information storage systems.

According to the fourth aspect of the present invention, there is provided an information-management system comprising the information storage system according to the second aspect, and an information collection system, and the information collection system comprising a collection/storage unit arranged to collect and store information stored by the storage unit of the information storage system from the information storage system.

According to the fifth aspect of the present invention, there is provided an information storage method comprising the acquisition step of acquiring information, and the storage step of storing the information acquired in the acquisition step while appending, to the information, deficient information of a) a local time of a predetermined area including a location where the information is acquired, b) a standard difference as a difference between an international standard time and a standard time of the predetermined area, and c) a season difference as a difference between the standard time and a local time of the predetermined area in a corresponding season.

According to the sixth aspect of the present invention, there is provided an information storage method comprising the acquisition step of acquiring information, and the storage step of storing the information acquired in the acquisition step while appending, to the information, deficient information of a) an international standard time, b) a standard difference as a difference between the international standard time and a standard time of a predetermined area including a location where the information is acquired, and c) a season difference as a difference between the standard time and a local time of the predetermined area in a corresponding season.

According to the seventh aspect of the present invention, there is provided an information management method comprising the steps of: making each of a plurality of information storage systems acquire information and store the acquired information while appending, to the information, deficient information of a) a local time of a predetermined area including a location where the information is acquired, b) a standard difference as a difference between an international standard time and a standard time of the predetermined area, and c) a season difference as a difference between the standard time and a local time of the predetermined area in a corresponding season; and making an information collection system collect and store the information stored by the plurality of information storage systems.

According to the eighth aspect of the present invention, there is provided an information management method comprising the steps of: making each of a plurality of information storage systems acquire information and store the acquired information while appending, to the information, deficient information of a) an international standard time, b) a standard difference as a difference between the international standard time and a standard time of a predetermined area including a location where the information is acquired, and c) a season difference as a difference between the standard time and a local time of the predetermined area in a corresponding season; and making an information collection system collect and store the information stored by the plurality of information storage systems.

According to the ninth aspect of the present invention, there is provided a computer program for controlling a computer to store information, comprising the acquisition step of acquiring information, and the storage step of storing the information acquired in the acquisition step while appending, to the information, deficient information of a) a local time of a predetermined area including a location where the information is acquired, b) a standard difference as a difference between an international standard time and a standard time of the predetermined area, and c) a season difference as a difference between the standard time and a local time of the predetermined area in a corresponding season.

According to the 10th aspect of the present invention, there is provided a computer program for controlling a computer to store information, comprising the acquisition step of acquiring information, and the storage step of storing the information acquired in the acquisition step while appending, to the information, deficient information of a) an international standard time, b) a standard difference as a difference between the international standard time and a standard time of a predetermined area including a location where the information is acquired, and c) a season difference as a difference between the standard time and a local time of the predetermined area in a corresponding season.

The 11th aspect of the present invention relates to a computer program which controls a general computer to make it operate as the information storage system according to the first or second aspect.

According to the 12th aspect of the present invention, there is provided an information management method comprising the steps of: appending, to information to be managed, deficient information of a) a local time of a predetermined area including a location where the information is acquired, b) a standard difference as a difference between an international standard time and a standard time of the predetermined area, and c) a season difference as a difference between the standard time and a local time of the predetermined area in a corresponding season; and managing the information appended with the local time, the standard difference, and the season difference on the basis of the local time, the standard difference, and the season difference.

According to the 13th aspect of the present invention, there is provided an information management method comprising the steps of: appending, to information to be managed, deficient information of a) an international standard time, b) a standard difference as a difference between the international standard time and a standard time of a predetermined area including a location where the information is acquired, and c) a season difference as a difference between the standard time and a local time of the predetermined area in a corresponding season; and managing the information appended with the international standard time, the standard difference, and the season difference on the basis of the international standard time, the standard difference, and the season difference.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows an example of a sort entry table;

FIG. 12 shows an example of a sort entry table;

DETAILED DESCRIPTION OF THE PREFERRED EMBODIMENTS

Preferred embodiments of the present invention will be described hereinafter with reference to the accompanying drawings.

First Embodiment

Figure 1:
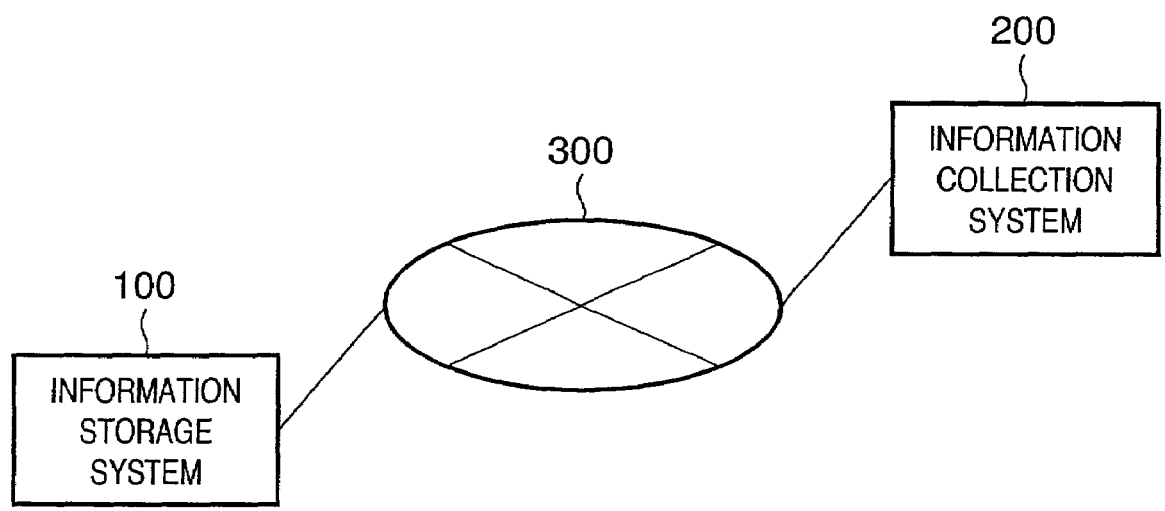
FIG. 1 is a schematic diagram showing the arrangement of an information management system according to a preferred embodiment of the present invention.

FIG. 1 shows a schematic arrangement of an information management system according to a preferred embodiment of the present invention. This information management system is constituted by connecting an information storage system 100 and information collection system 200 via a network (e.g., the Internet) 300.

Figure 2:
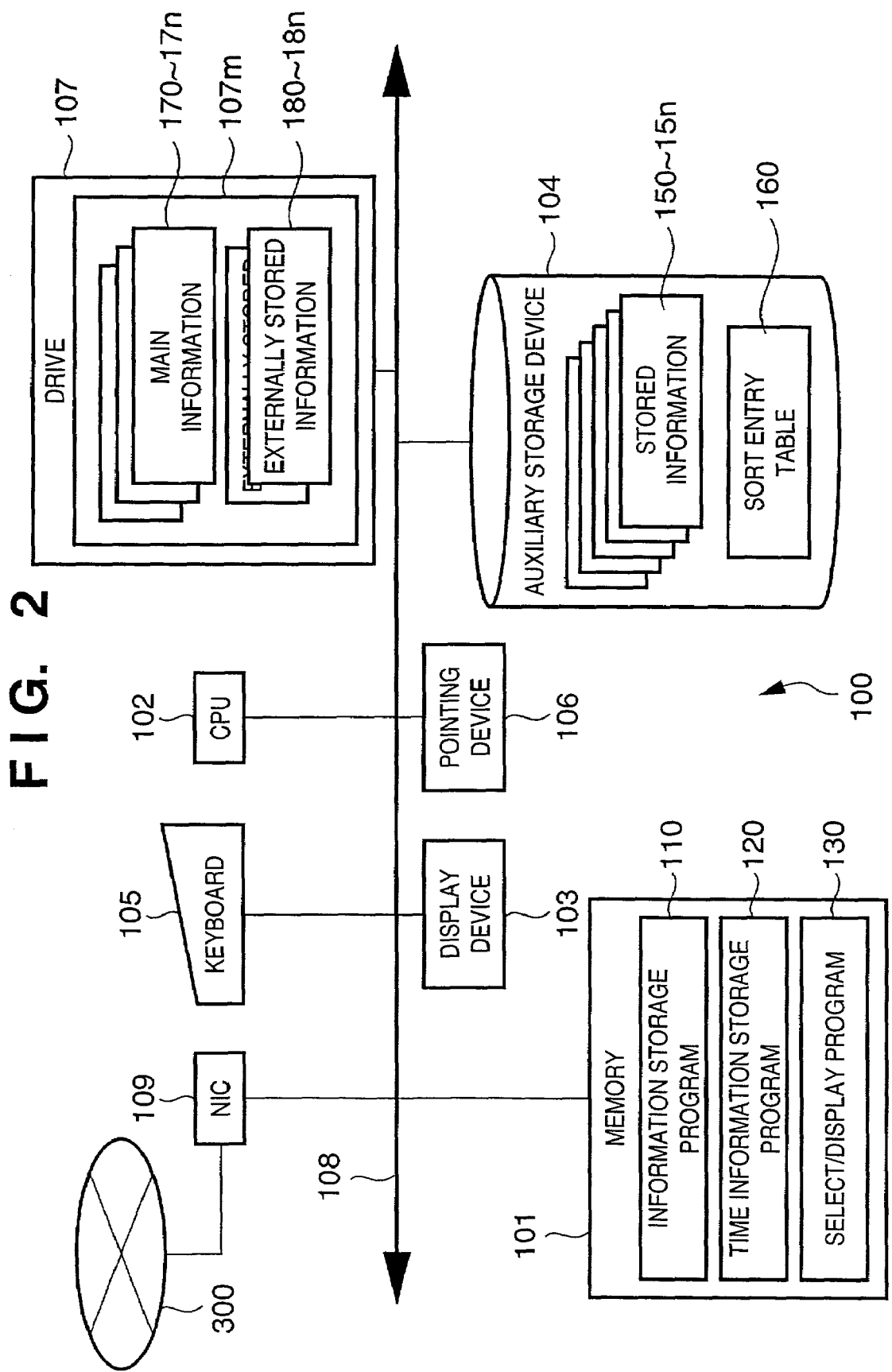
FIG. 2 is a block diagram showing the arrangement of an information storage system 100 shown in FIG. 1.

FIG. 2 shows the arrangement of the information storage system 100 shown in FIG. 1. This information storage system 100 is implemented by installing specific software in, e.g., a general computer.

The information storage system 100 comprises a memory (e.g., a RAM) 101 for storing programs and data required to start up the system, a CPU 102 for making arithmetic operations and control, a display device 103 for displaying information such as characters, symbols, images, and the like, an auxiliary storage device (e.g., an HDD) 104 for saving data and information, a keyboard 105 used to input characters and the like, a pointing device (e.g., a mouse) 106 used to point to an arbitrary position on the screen of the display device 103, a drive 107 for a removable memory medium (e.g., a CF card, smart card, memory stick, FD, DVD-RAM, or the like) 107m, and a network interface card 109 connected to the network 300 such as the Internet or the like, and these components are connected via a bus 108.

The memory 101 stores an information storage program 110, time information storage program 120, and select/display program 130. Typically, these programs are read out from the auxiliary storage device 104 and are loaded onto the memory 101 when they are launched. The auxiliary storage device 104 stores a plurality of pieces of stored information 150 to 15n, and sort entry table 160. The memory medium 107m inserted into the drive 107 stores a plurality of pieces of main information 170 to 17n and a plurality of pieces of externally stored information 180 to 18n.

Figure 4:
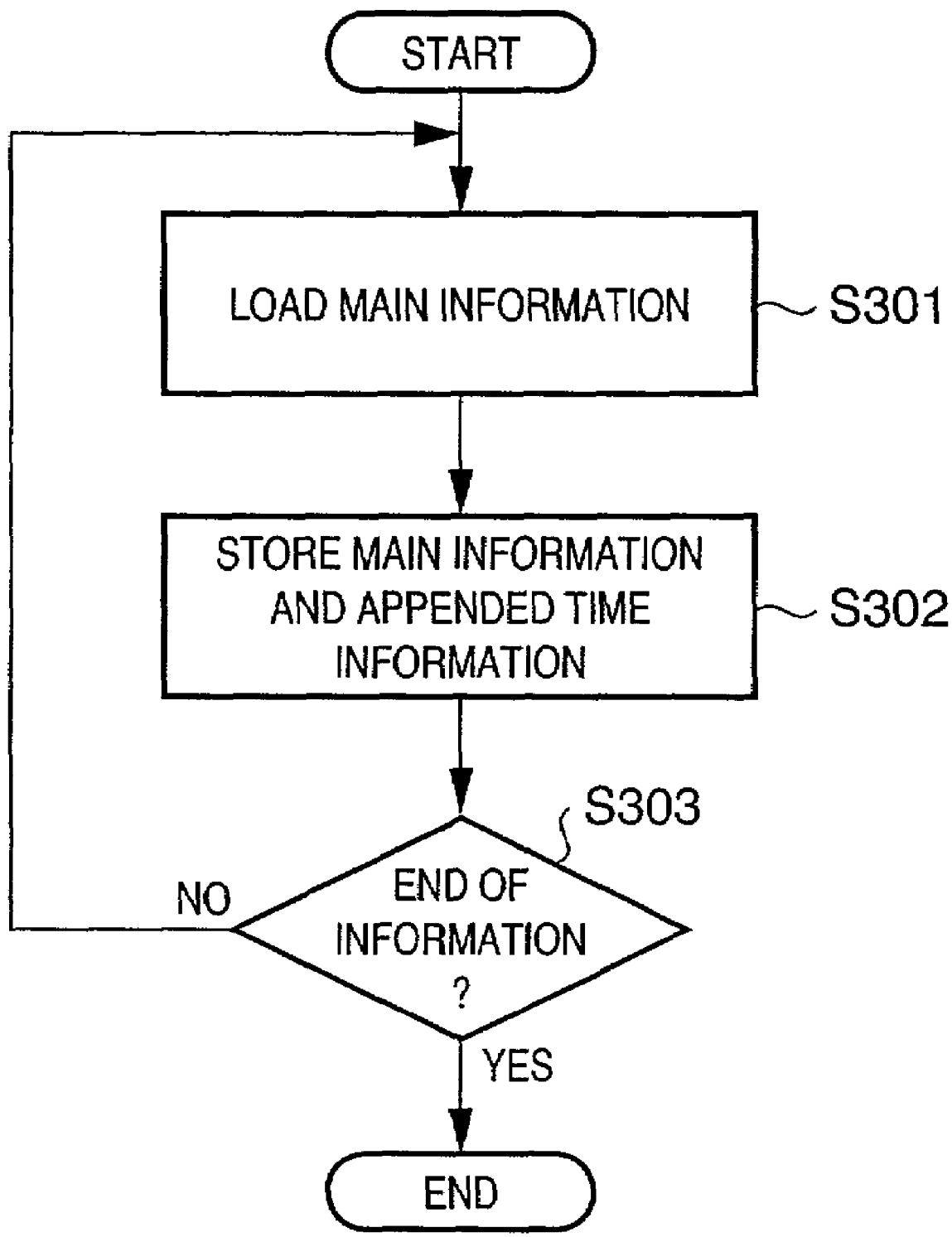
FIG. 4 is a flow chart showing an example of the process of an information storage program 110.

FIG. 4 is a flow chart showing an example of the process of the information storage program 110. In step S301, main information (e.g., an image) (170 to 17n) is loaded from the memory medium 107m inserted into the drive 107. In step S302, the main information (170 to 17n) is stored in the auxiliary storage device 104 as the stored information (150 to 15n) while appending information of a local time (e.g., the current local time) 121 to it. Steps S301 and S302 are repeated for all pieces of main information 170 to 17n. When local time information has already been appended to the main information stored in the memory medium 107m inserted into the drive 107, no local time information need be appended to the main information in step S302. Note that the process of the information storage program 110 is the same as that based on a general copy and transfer commands, and can be implemented by drag-and-drop operations on a general OS.

Figure 5:
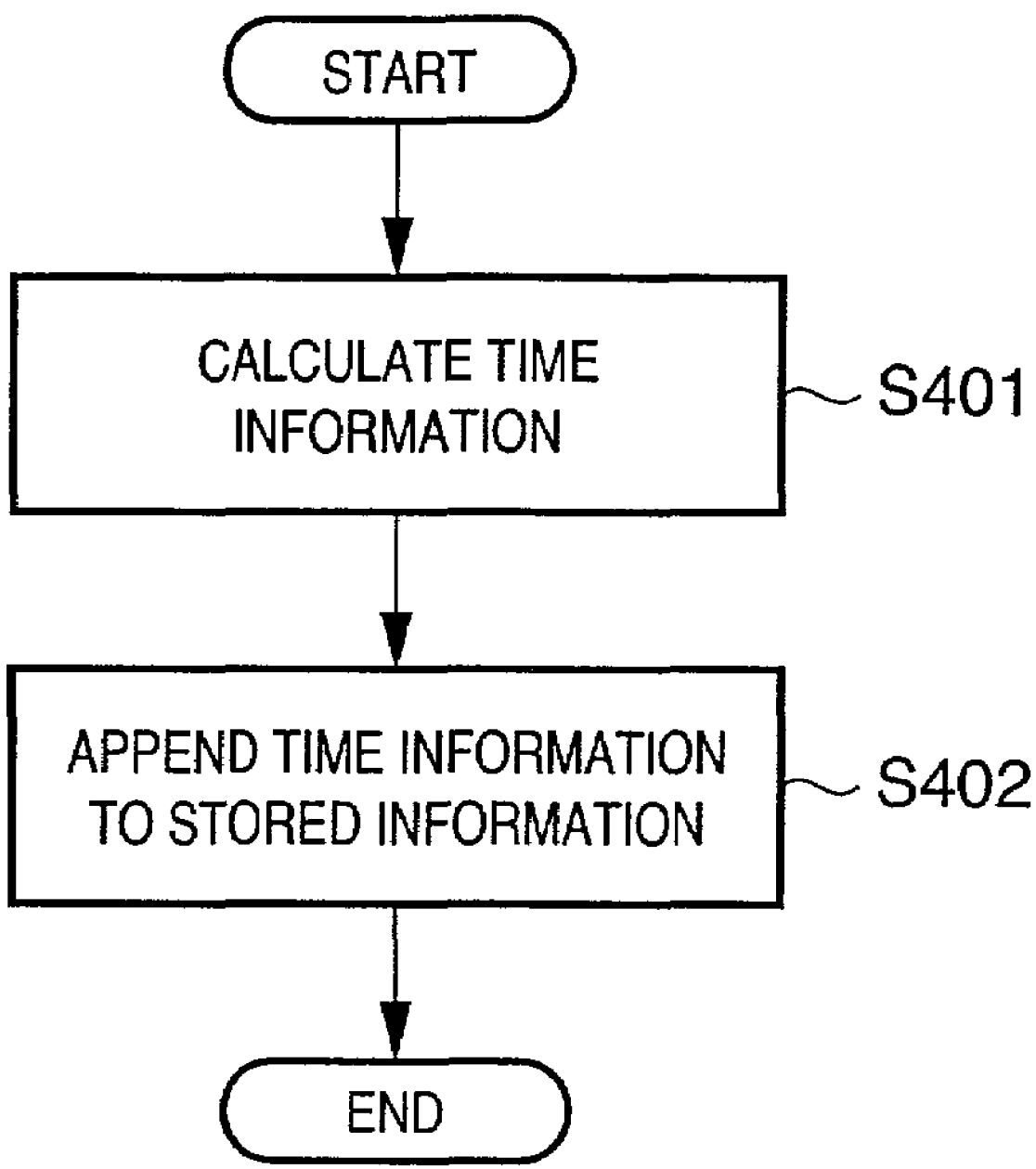
FIG. 5 is a flow chart showing an example of the process of a time information storage program 120.

FIG. 5 is a flow chart showing the process of the time information storage program 120. In this embodiment, the time information storage program 120 is executed after the plurality of pieces of stored information 150 to 15n are stored in the auxiliary storage device 104.

In step S401, a difference 122 between the international standard time and the standard time of a given area (to be referred to as a standard difference hereinafter), and a difference 123 between the standard time and the local time of the corresponding area (to be referred to as a season difference hereinafter) in the corresponding season are acquired for each stored information (150 to 15n) on the basis of a local time 121 appended to each stored information (150 to 15n). These differences can be acquired based on a time library or the like equipped in a standard OS (operating system). Note that the season difference 123 assumes a corresponding value (a value indicating the difference between the standard time and the local time of the corresponding area in the corresponding season) other than 0:00 when the system is operated based on the D.S.T. in an area that adopts the D.S.T. system, and assumes 0:00 when the system is not operated based on the D.S.T. (i.e., when the standard time of the corresponding area matches the local time).

The relationship among the international standard time, standard difference, and season difference is given by:

(international standard time)=(local time)−(standard difference)−(season difference)

For example, in an area in which the difference (standard difference) between the international standard time and local time is +9 hours (+9:00), when a local time as the D.S.T. system is not used (season difference=0:00) is 12:00 (noon) on Nov. 1, 2000, the international standard time is 3:00 (forenoon) on Nov. 1, 2000.

For example, in an area in which the difference (standard difference) between the international standard time and local time is +1 hour and 35 minutes (+1:35), and in which the local time is advanced 20 minutes ahead of the standard time of that area for the D.S.T. operation (season difference=+0: 20), when the local time is 12:00 (noon) on Nov. 1, 2000, the international standard time is 10:05 (forenoon) on Nov. 1, 2000.

Conversely, from the current international standard time, standard difference, and season difference, the local time can be calculated by:

(local time)=(international standard time)+(standard difference)+(season difference)

In step S402, the corresponding standard difference 122 and season difference 123 are appended to each stored information (150 to 15n) stored in the auxiliary storage device 104.

In the above example, the information storage program 110 and time information storage program 120 are independently executed. Alternatively, the two programs may be combined into one program, which may be executed to append deficient information of the local time, standard difference, and season difference to main information.

Figure 6:
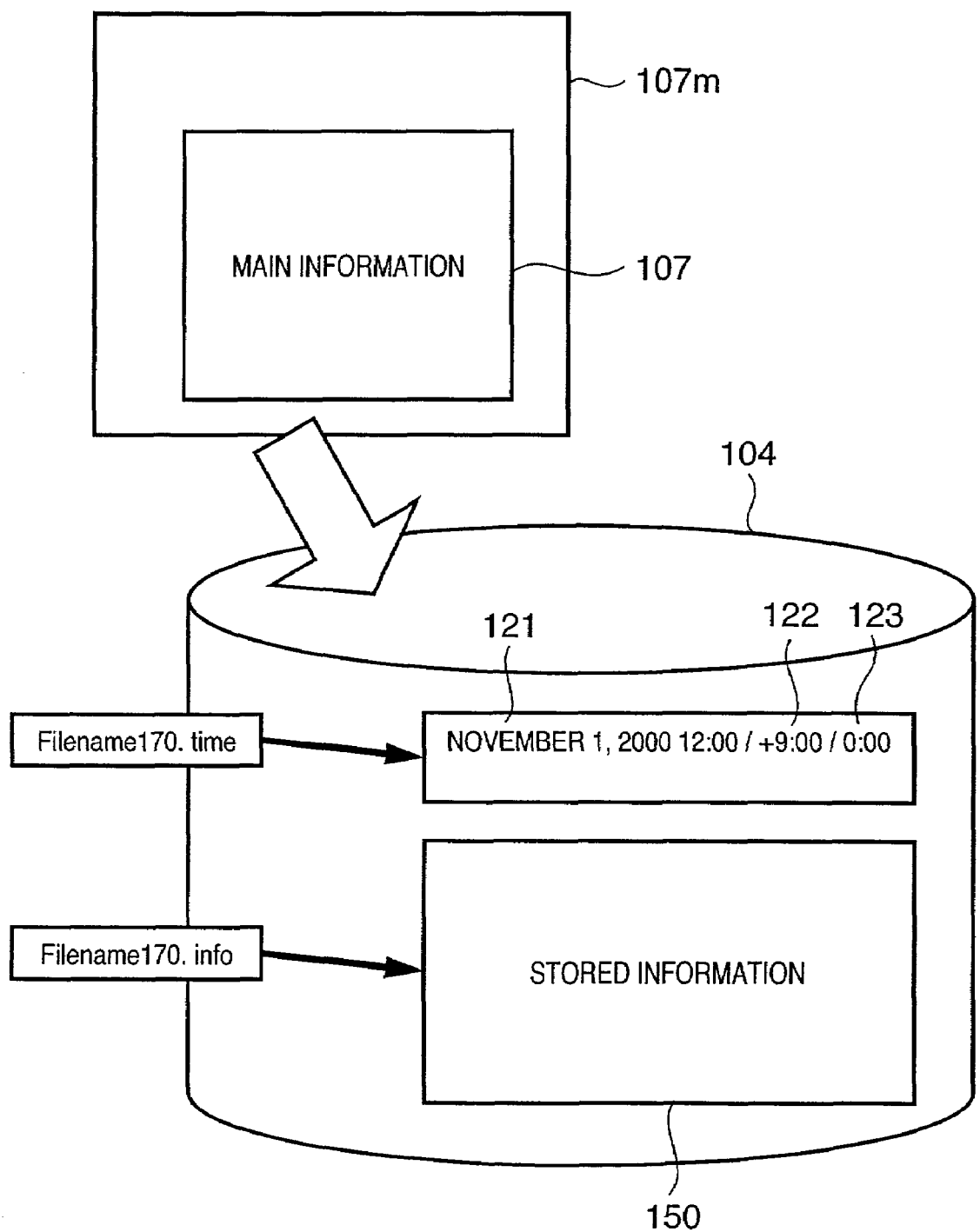
FIG. 6 illustrates an example of a method of storing main information 170 provided from a memory medium 107m in stored information 150 while appending time information thereto by the information storage program 110 and time information storage program 120.

FIG. 6 illustrates an example of a method of storing main information 170 provided from the memory medium 107m in stored information 150 while appending time information to it by the information storage program 110 and time information storage program 120. In the example shown in FIG. 6, one main information 170 in the memory medium 107m is stored as the stored information in the auxiliary storage device 104, and a file name "Filename170.info" is given to the stored information 150. Also, in the example shown in FIG. 6, time information (local time 121, standard difference 122, season difference 123) as the sub information is stored in the auxiliary storage device 104 to have a file name "Filename170.time" in association with the stored information 150.

Figure 7:
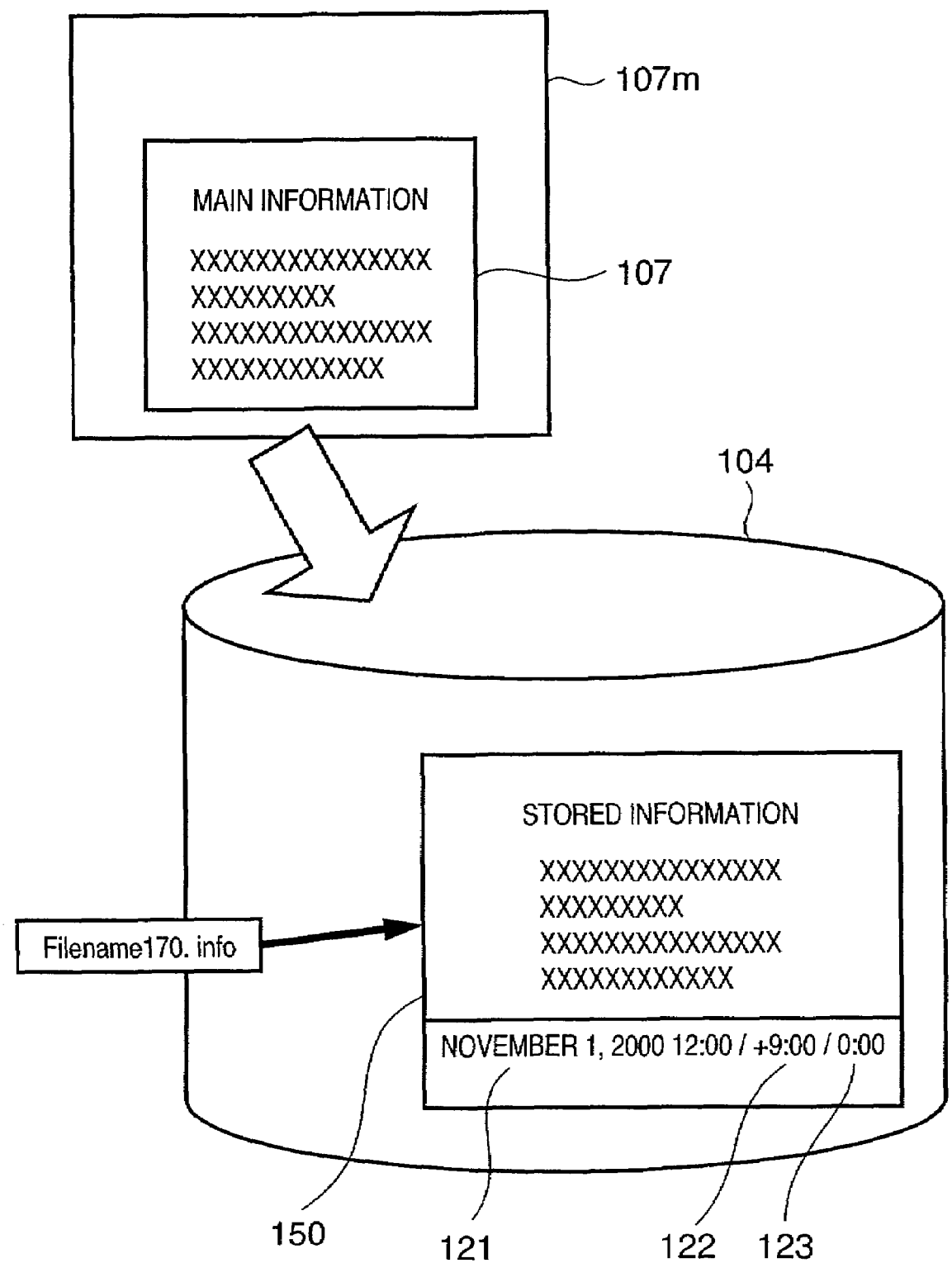
FIG. 7 illustrates another example of a method of storing main information 170 provided from the memory medium 107m in stored information 150 while appending time information thereto by the information storage program 110 and time information storage program 120.

FIG. 7 illustrates another example of a method of storing main information 170 provided from the memory medium 107m in stored information 150 while appending time information to it by the information storage program 110 and time information storage program 120. In the example shown in FIG. 7, one main information 170 in the memory medium 107m is stored as the stored information in the auxiliary storage device 104, a file name "Filename170.info" is given to the stored information 150, and time information (local time 121, standard difference 122, season difference 123) as the sub information is additionally written in the stored information.

Figure 8:
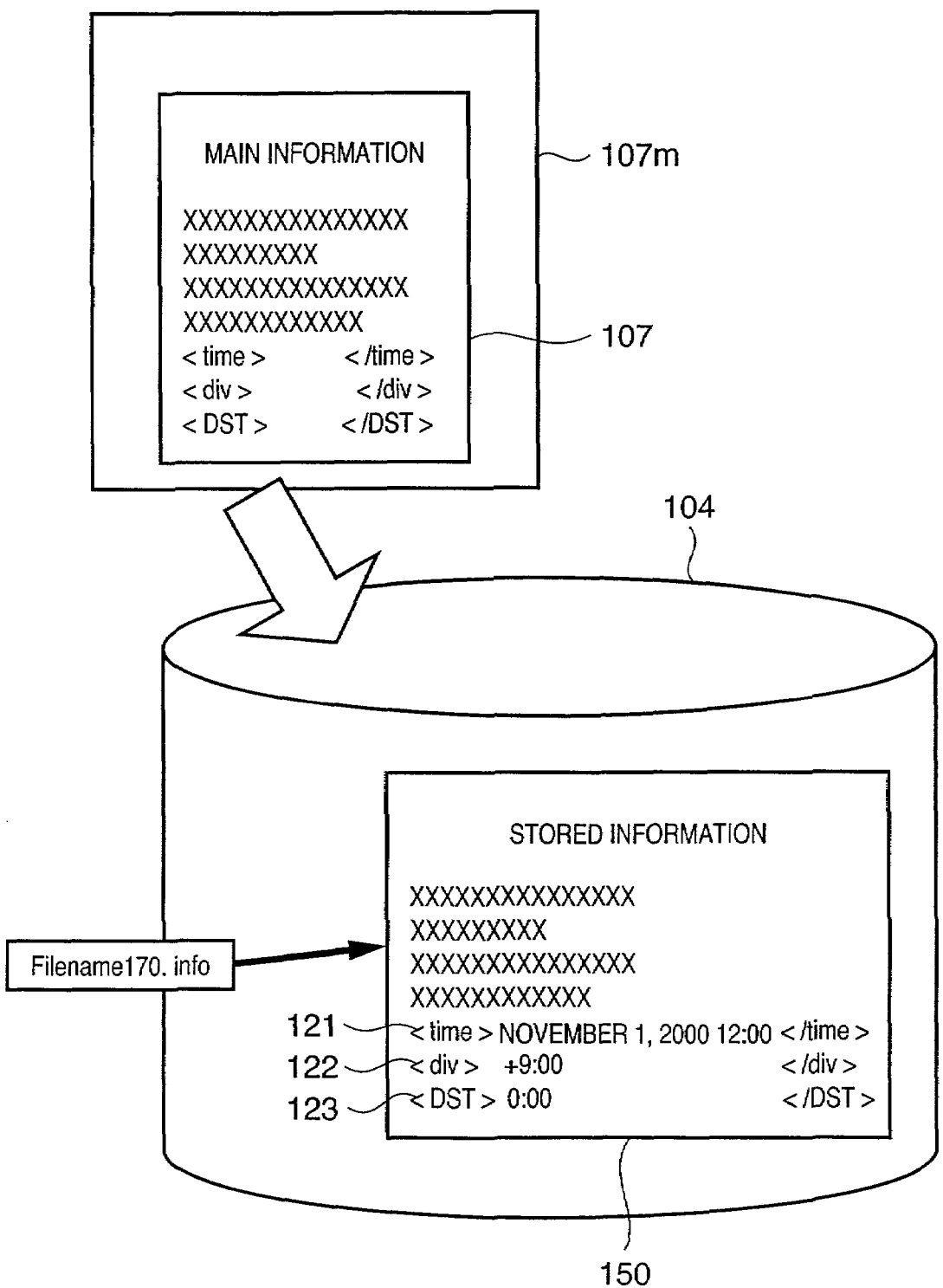
FIG. 8 illustrates still another example of a method of storing main information 170 provided from the memory medium 107m in stored information 150 while appending time information thereto by the information storage program 110 and time information storage program 120.

FIG. 8 illustrates still another example of a method of storing main information 170 provided from the memory medium 107m in stored information 150 while appending time information to it by the information storage program 110 and time information storage program 120. In the example shown in FIG. 8, main information 170 originally has a field for holding time information, and time information (local time 121, standard difference 122, season difference 123) as the sub information is recorded upon storing the main information 170 in the auxiliary storage device 104.

Figure 10:
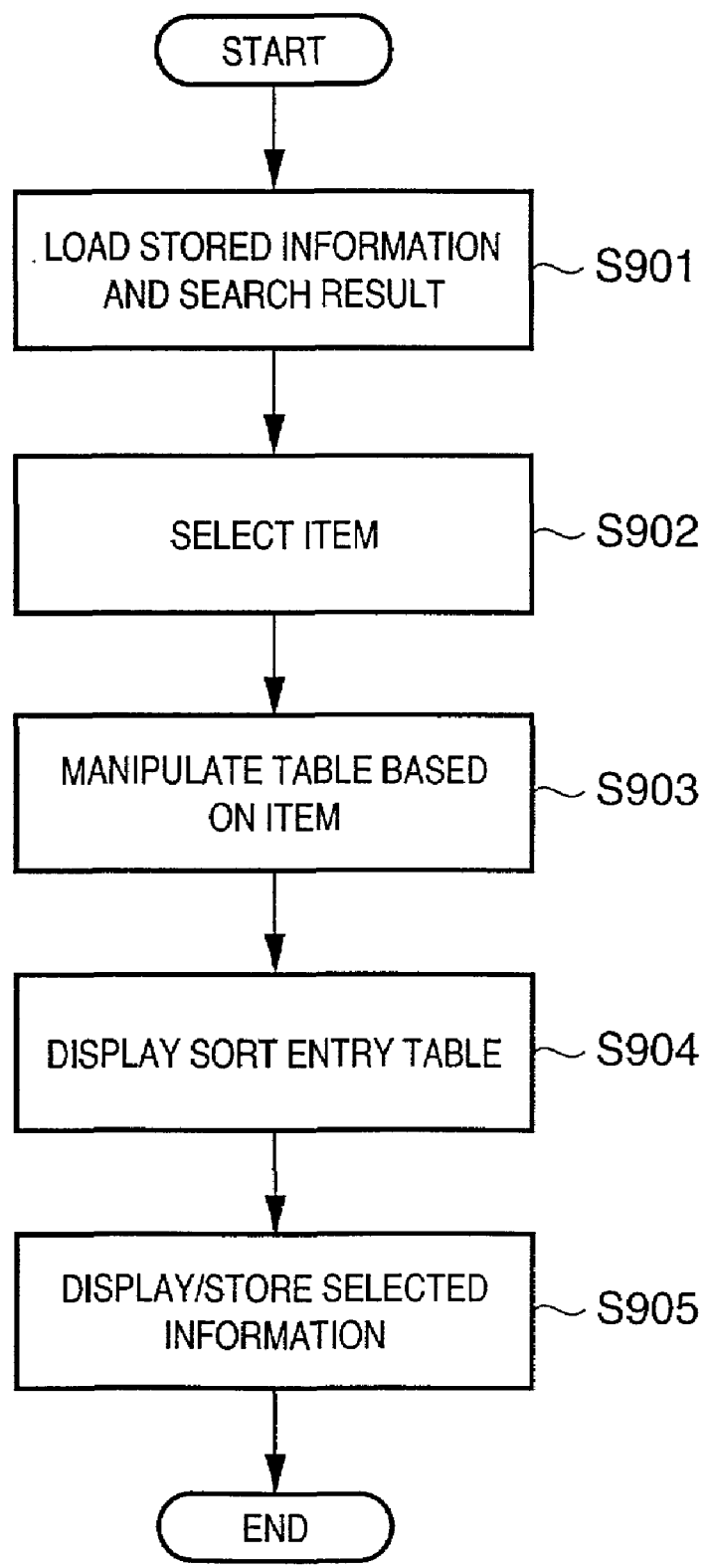
FIG. 10 is a flow chart showing an example of the process of a select/display program 130.

FIG. 10 is a flow chart showing an example of the process of the select/display program 130. In step S901, a plurality of pieces of stored information 150 to 15n stored in the auxiliary storage device 104 (or sub information independently stored in association with those pieces of information) or a plurality of pieces of externally stored information 180 to 18n stored in the memory medium 107m inserted into the drive 107 (or sub information independently stored in association with those pieces of information) are loaded to generate a sort entry table 160, an example of which is shown in FIG. 9. Note that the externally stored information (180 to 18n) is stored in the memory medium 107m in the same format as the stored information (150 to 15n), and is the same as that which can be stored in the memory medium 107m in step S905 (to be described later). Also, stored information may be loaded from another memory device or medium in step S901.

In the example shown in FIG. 9, the sort entry table 160 contains time information (local time 121, standard difference 122, season difference 123) as sub information and a file name (information used to access main information) as items. Using this sort entry table 160, an accurate international standard time corresponding to a local time can be obtained. Also, using this sort entry table 160, for example, the local times and international standard times can be easily obtained, and a plurality of pieces of main information can be sorted based on these times in the order of local times or international standard times.

Figure 11:
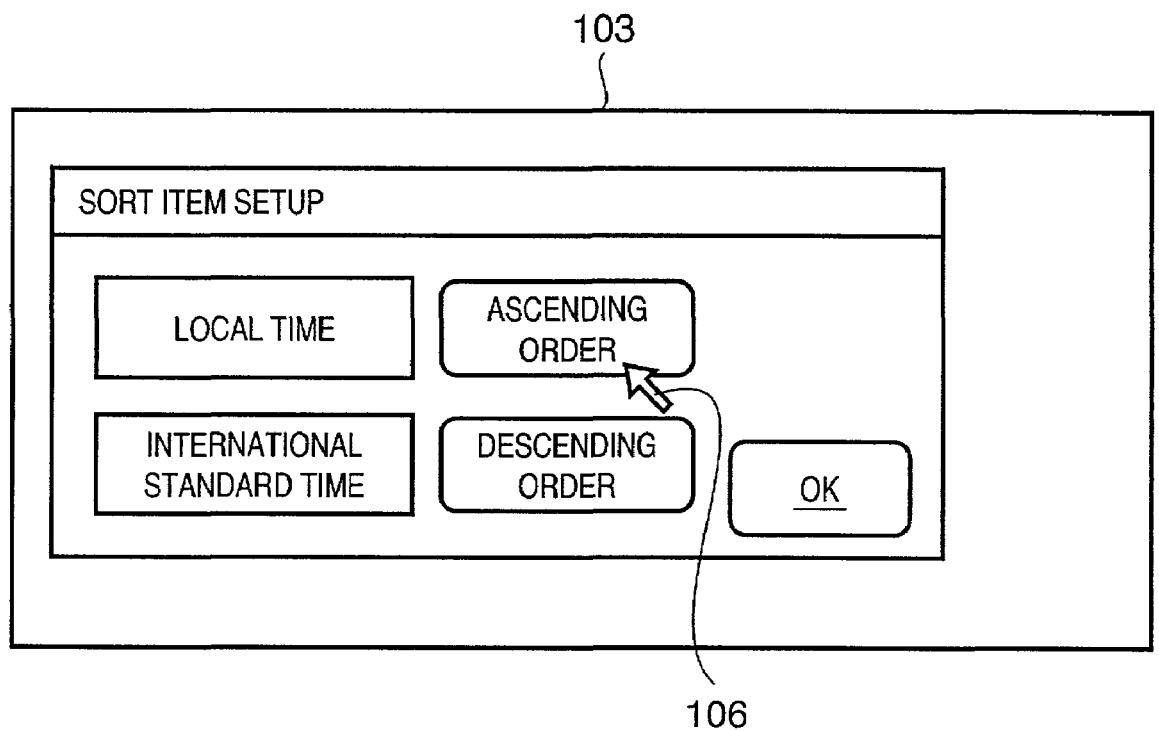
FIG. 11 shows an example of a setup window of items associated with sorting displayed on a display device 103 in step S902.

In step S902, items (e.g., local time, and international standard time) used to manipulate (e.g., sort) the sort entry table 160 are displayed on the display device 103 to prompt the user to select a desired item. This selection is attained using, e.g., the keyboard 105 or pointing device 106. As items used to manipulate (e.g., sort) the sort entry table 160, items other than the local time and international standard time may be used. For example, the standard difference, season difference, file name (e.g., Filename170.info), comment, other attributes (information size, information value, access frequency, and the like) of main information, and the like may be used. FIG. 11 shows an example of a setup window of items associated with sorting, which is displayed on the display device 103 in step S902. In the example shown in FIG. 11, the user can designate ascending or descending sort using the local time or international standard time as a key. In step S902, the user may select items such as the local time, international standard time, or the like for purposes other than sorting.

In step S903, the sort entry table 160 is manipulated based on the condition designated in step S902. Typically, the contents of the sort entry table 160 are sorted in step S903 based on the condition designated in step S902. FIG. 12 shows an example as a result of ascending sort of the sort entry table 160 shown in FIG. 9 using the international standard time as a key. As described above, reference numeral 121 denotes the local time in this embodiment.

In step S904, a manipulated sort entry table 161 is displayed on the display device 103.

Figure 18:
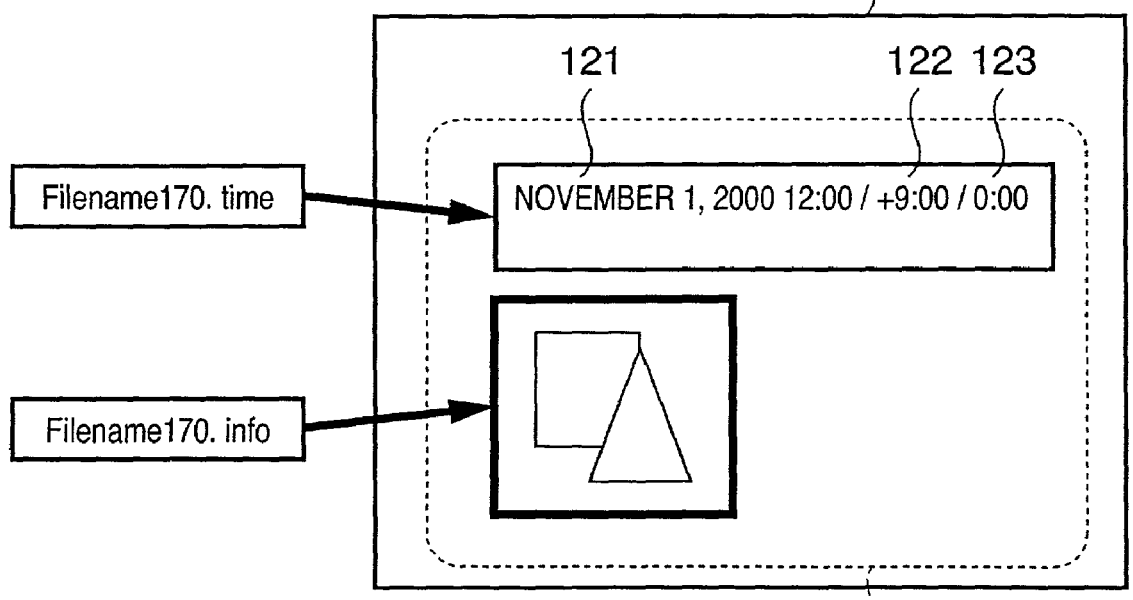
FIG. 18 shows an example of the process for outputting stored information (an example of a display process)

In step S905, a process according to a user's instruction input via the keyboard 105, pointing device 106, or the like is executed. This process includes a process for displaying stored information (filename170.info) designated by the user from a plurality of pieces of stored information (150 to 15n), a process for storing that stored information in the memory medium 107m or the like as externally stored information (180 to 18n), a process for sending that stored information to another apparatus using the network 300 and the like, and so forth, as shown in FIG. 18.

In the above process, the stored information is manipulated (e.g., it is displayed or is stored in another memory medium device or medium) using the sort entry table 161 (160). Also, the stored information may be manipulated (e.g., it is displayed or is stored in another memory medium device or medium) on the basis of the time information appended to the stored information (150 to 15n) or externally stored information (180 to 18n).

In the above process, steps S902 and S903 may be skipped, i.e., the sort entry table may be directly displayed on the display device 103 in step S904 without manipulating (e.g., sorting) the original sort entry table 160.

When the information storage system 100 is used as only an apparatus for appending time information as sub information to main information, the select/display program 130 may be omitted.

Figure 3:
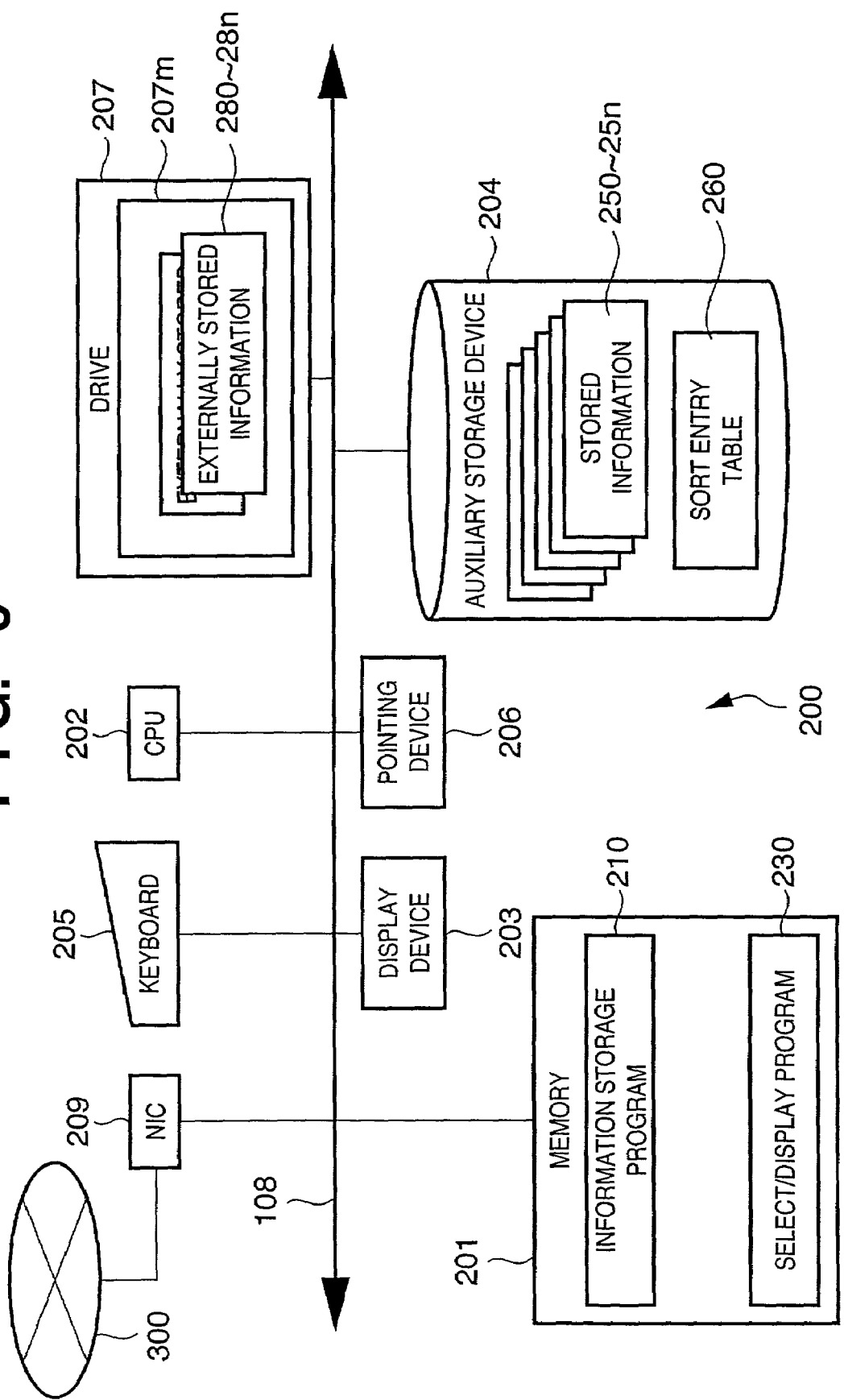
FIG. 3 is a block diagram showing the arrangement of an information collection system 200 shown in FIG. 1.

FIG. 3 shows the arrangement of the information collection system 200 shown in FIG. 1. This information collection system 200 is implemented by installing specific software in, e.g., a general computer.

This information collection system 200 comprises a memory (e.g., a RAM) 201 for storing programs and data required to start up the system, a CPU 202 for making arithmetic operations and control, a display device 203 for displaying information such as characters, symbols, images, and the like, an auxiliary storage device (e.g., an HDD) 204 for saving data and information, a keyboard 205 used to input characters and the like, a pointing device (e.g., a mouse) 206 used to point to an arbitrary position on the screen of the display device 203, a drive 207 for a removable memory medium (e.g., a CF card, smart card, memory stick, FD, DVD-RAM, or the like) 207m, and a network interface card 209 connected to the network 300 such as the Internet or the like, and these components are connected via a bus 208.

The memory 201 stores an information collection program 210 and select/display program 230. Also, the auxiliary storage device 204 stores a plurality of pieces of stored information 250 to 25n, and a sort entry table 260. The memory medium 207m inserted into the drive 207 stores a plurality of pieces of externally stored information 280 to 28n.

Figure 19:
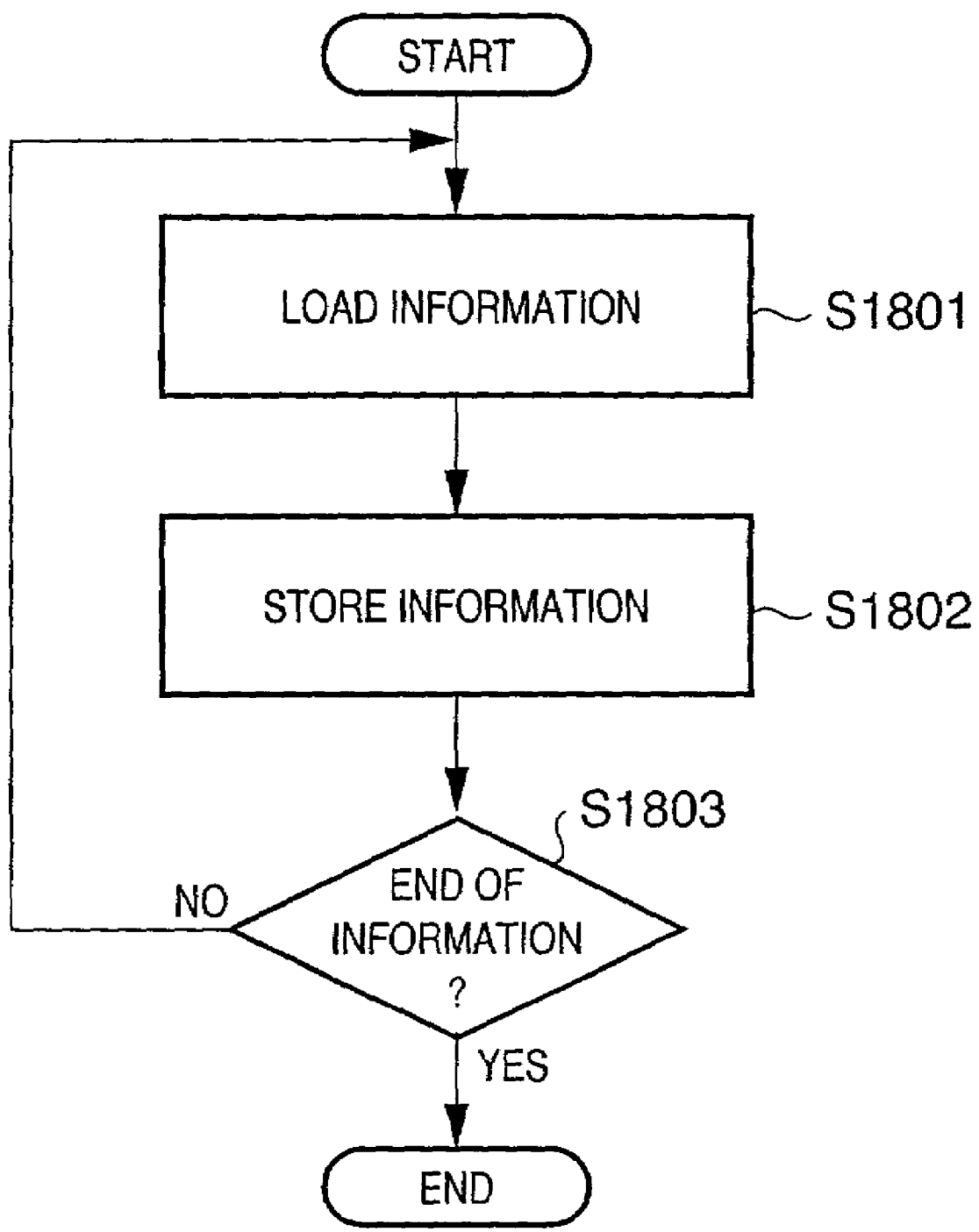
FIG. 19 is a flow chart showing an example of the process of an information collection program 210.

FIG. 19 is a flow chart showing an example of the process of the information collection program 210. In step S1801, stored information (150 to 15n) stored in the auxiliary storage device 104 of the information storage system 100 is loaded (collected) via the network 300. In step S1802, the stored information (150 to 15n) are stored as stored information (250 to 25n) in the auxiliary storage device 204. Steps S1801 and S1802 are repeated for all pieces of stored information 150 to 15n. Note that information to be loaded (collected) and stored may include not only stored information stored in the information storage system 100, and a plurality of pieces of stored information 280 to 28n stored in the memory medium 207m inserted in the information collection system 200.

The select/display program 230 is the same as the select program 130 mentioned above. However, the select/display program 230 processes a plurality of pieces of stored information 250 to 25n stored in the auxiliary storage device 204 of the information collection system 200.

Since the information collection system is equipped, a plurality of pieces of stored information 150 to 15n stored in the information storage system 100, a plurality of pieces of externally stored information 180 to 18n, a plurality of pieces of externally stored information 280 to 28n directly provided to the information collection system 200, and the like can be simultaneously managed. As described above, since such stored information is appended with time information as sub information, the information collection system 200 can consistently manage these pieces of stored information based on the time information. For example, the information collection system 200 can sort or search these pieces of stored information using the local time or international standard time as a key.

In this embodiment, deficient information of the local time 121, standard difference 122, and season difference 123 is appended to main information upon storing the main information. However, this embodiment may be modified as follows. That is, deficient information of the international standard time, standard difference 122, and season difference 123 may be appended to main information upon storing the main information. In this case as well, since the local time can be calculated from the international standard time, standard difference 122, and season difference 123 in accordance with the equation mentioned above, both the international standard time and local time can be confirmed.

According to the above embodiment, even when a plurality of main information 170 to 17n are disorderly recorded, generated, and so forth in various countries and areas over a long term, time information that directly or indirectly indicates a local time and international standard time is appended to the main information (170 to 17n) upon storing the main information in the information management system to obtain a plurality of pieces of stored information 150 to 15n (250 to 25n). Hence, the stored information (150 to 15n) can be utilized later using the local time or international standard time as a key.

Also, according to this embodiment, since the standard difference or season difference is appended as sub information (time information) to main information upon storing the main information, the time difference or the like between countries or areas where the main information is created can be confirmed. Since either the local time or international standard time is appended to main information as sub information indicating time upon managing the main information, when the sub information is, for example, displayed or printed together with the main information, identification error due to the presence of both the local time and international standard time can be prevented.

Second Embodiment

The information management system according to the first embodiment comprises one information storage system and one information collection system. However, an information management system according to this embodiment comprises a plurality of information storage systems and at least one information collection system.

With the information management system according to this embodiment as well, stored information can be utilized using the local time or international standard time as a key.

Figure 20:
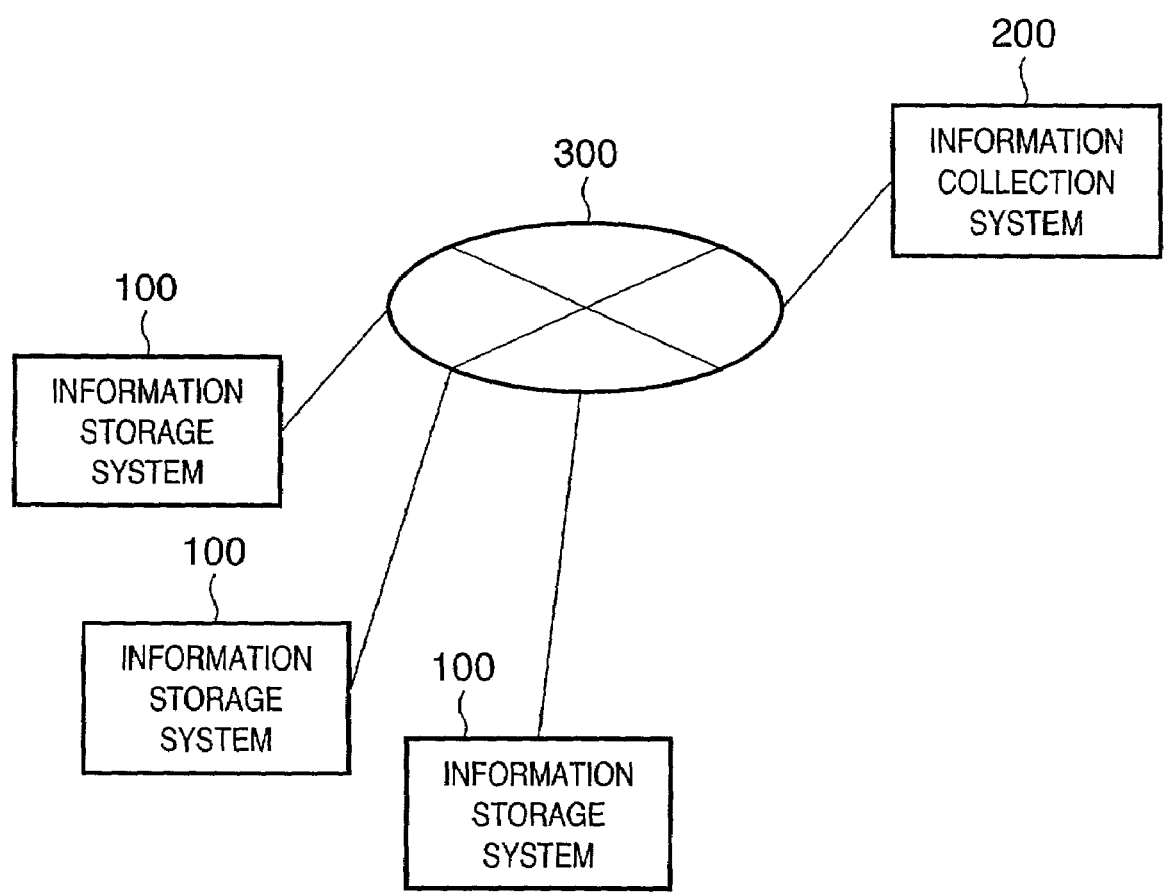
FIG. 20 is a schematic diagram showing the arrangement of an information management system according to the second embodiment of the present invention.

FIG. 20 shows a schematic arrangement of the information management system according to the second embodiment of the present invention. This information management system comprises a plurality of information storage systems 100 and at least one information collection system 200, which are connected via a network (e.g., the Internet) 300.

Each information storage system 100 according to this embodiment is the same as that in the first embodiment.

Also, the information collection system 200 according to this embodiment is substantially the same as that (see FIG. 3) in the first embodiment, except for the process of the information collection program 210 (see FIG. 18). More specifically, in this embodiment, the information collection program 210 loads a plurality of pieces of stored information 150 to 15n from each of the plurality of information storage systems 100 in step S1801.

Third Embodiment

In the information management systems according to the first and second embodiments, the information storage system has a function of loading and storing main information stored in a memory medium. On the other hand, in an information management system according to this embodiment, an information storage system has a function of storing main information transferred from another apparatus. As the other apparatus, for example, a camera and, more particularly, a camera used on a network or the like may be used.

Figure 13:
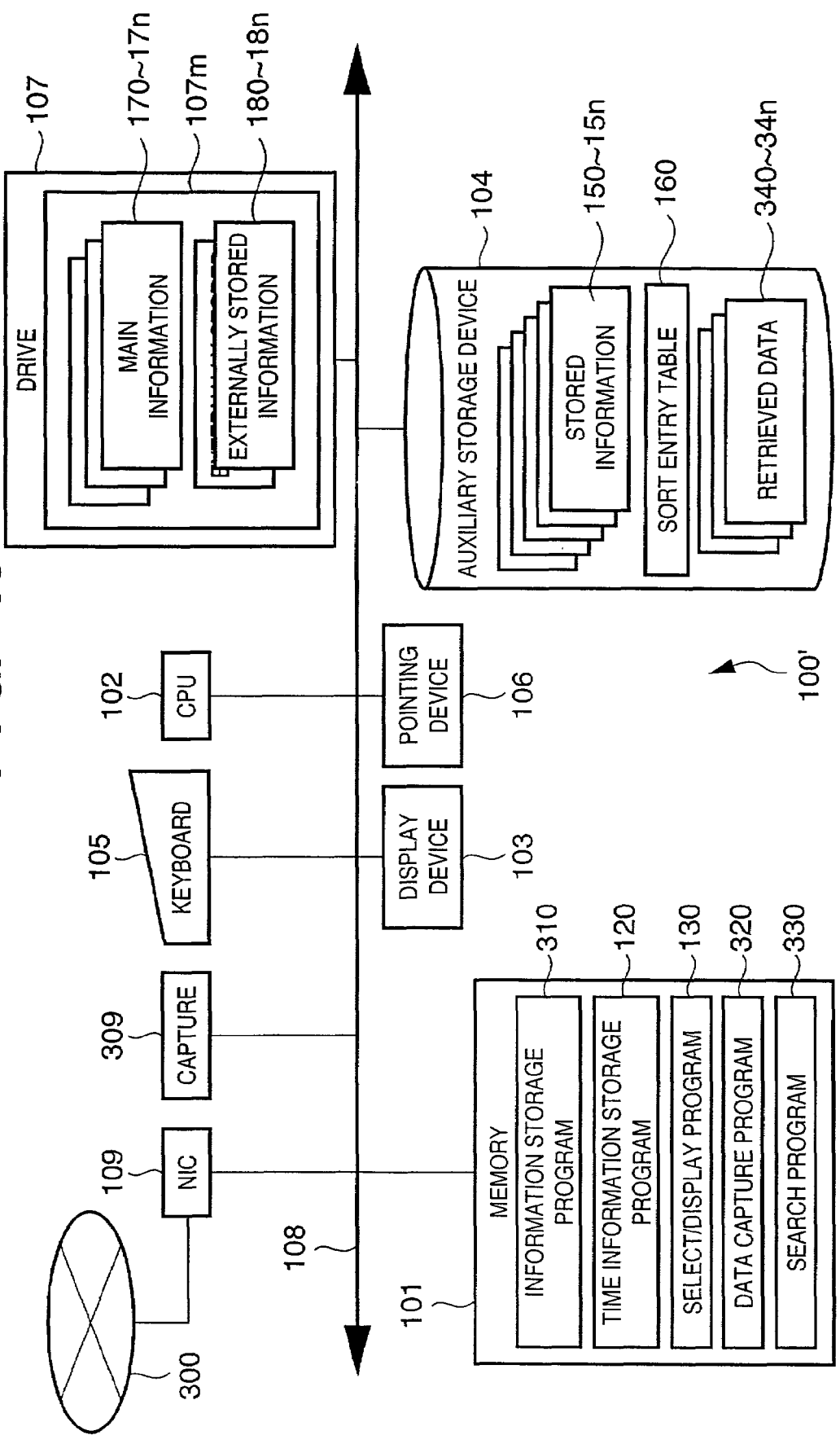
FIG. 13 is a block diagram showing the arrangement of an information storage system in an information management system according to the third embodiment of the present invention.

More specifically, the information management system according to this embodiment has an arrangement in which the information storage system 100 in the information management system according to the first or second embodiment is replaced by an information storage system 100' shown in FIG. 13.

In the information storage system 100' according to this embodiment, a data capture 309, data capture program 320, and search program 330 are added to the information storage system 100 shown in FIG. 2.

The memory 101 stores the data capture program 320 and search program 330 in addition to an information storage program 310, the time information storage program 120, and the select/display program 130. Typically, these programs are read out from the auxiliary storage device 104 and are loaded onto the memory 101 when they are launched. The auxiliary storage device 104 stores retrieved data 340 to 34n in addition to a plurality of pieces of stored information 150 to 15n and sort entry table 160.

Figure 14:
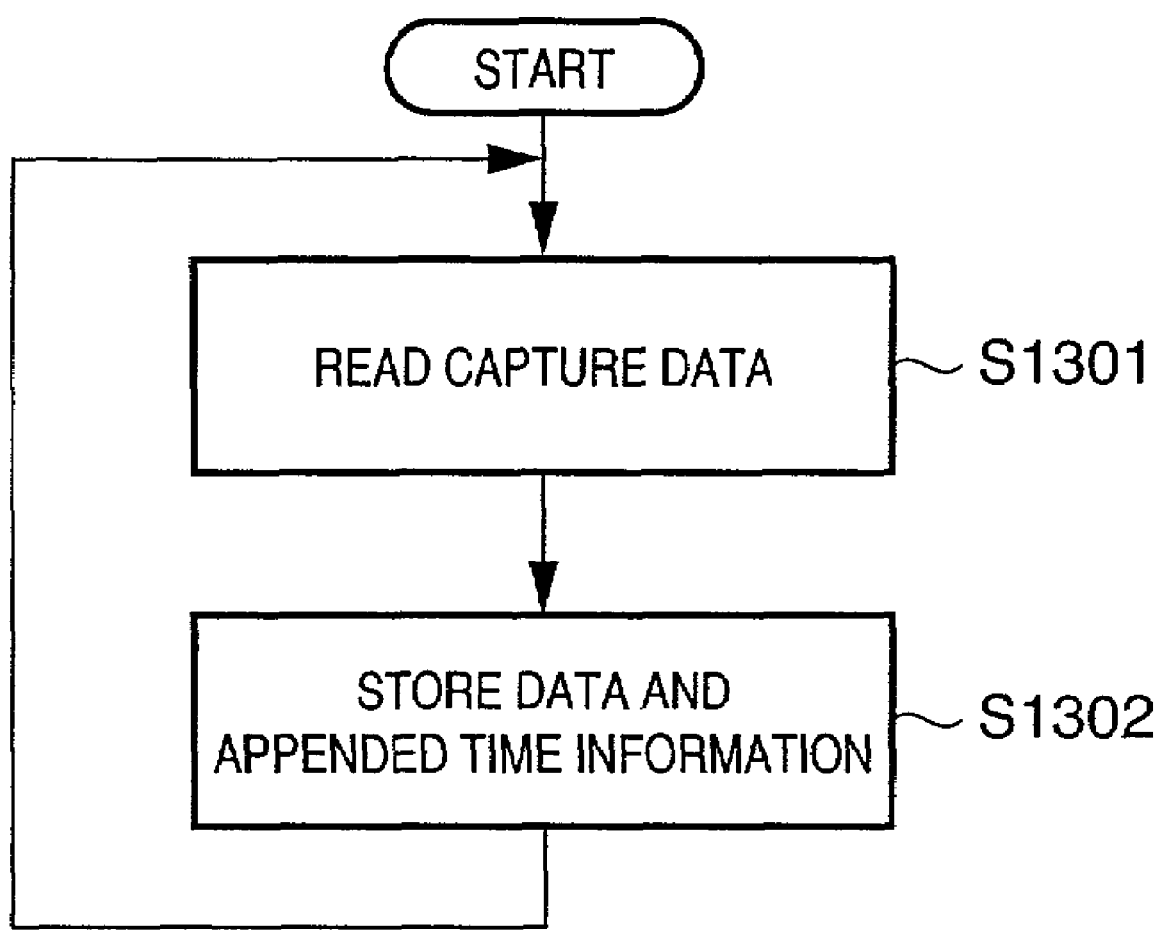
FIG. 14 is a flow chart showing an example of the process of an information storage program 310.

FIG. 14 is a flow chart showing an example of the process of the information storage program 310. In step S1301, capture data 330 as main information is read from the data capture 309. This data capture 309 may comprise, e.g., a card connected to a digital camera (still or video camera), a network card, or other types of cards. In step S1302, local time information is appended to the read capture data as the main information, and that data is stored as stored information (150 to 15*n*) in the auxiliary storage device 104. Steps S1301 and S1302 are repeated for a plurality of pieces of main information.

The process of the time information storage program 120 is shown in FIG. 5, and is the same as that in the first and second embodiments. Also, the process of the select/display program 130 is shown in FIG. 10, and is the same as that in the first and second embodiments.

Figure 15:
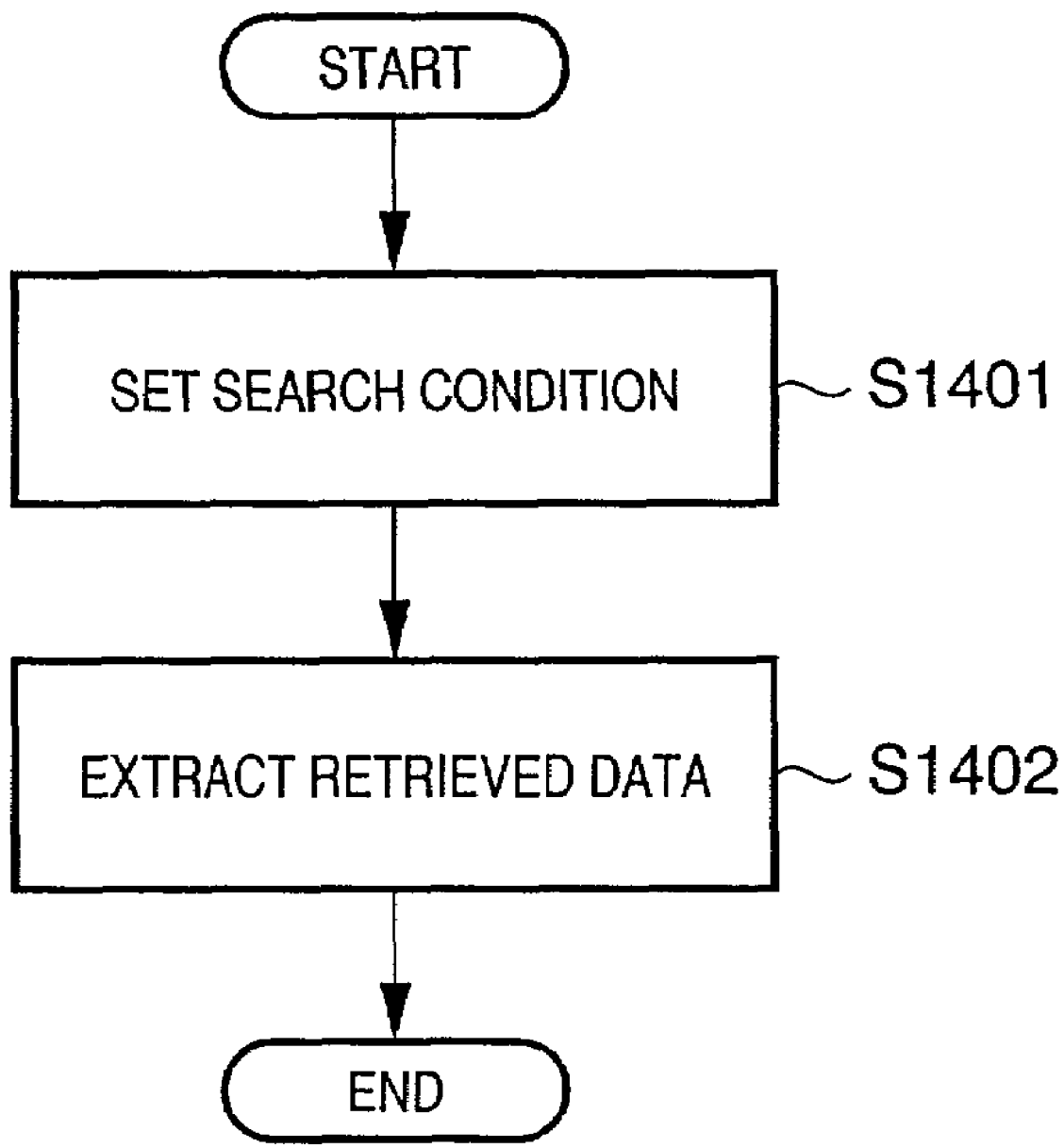
FIG. 15 is a flow chart showing an example of the process of a search program 330.
Figure 16:
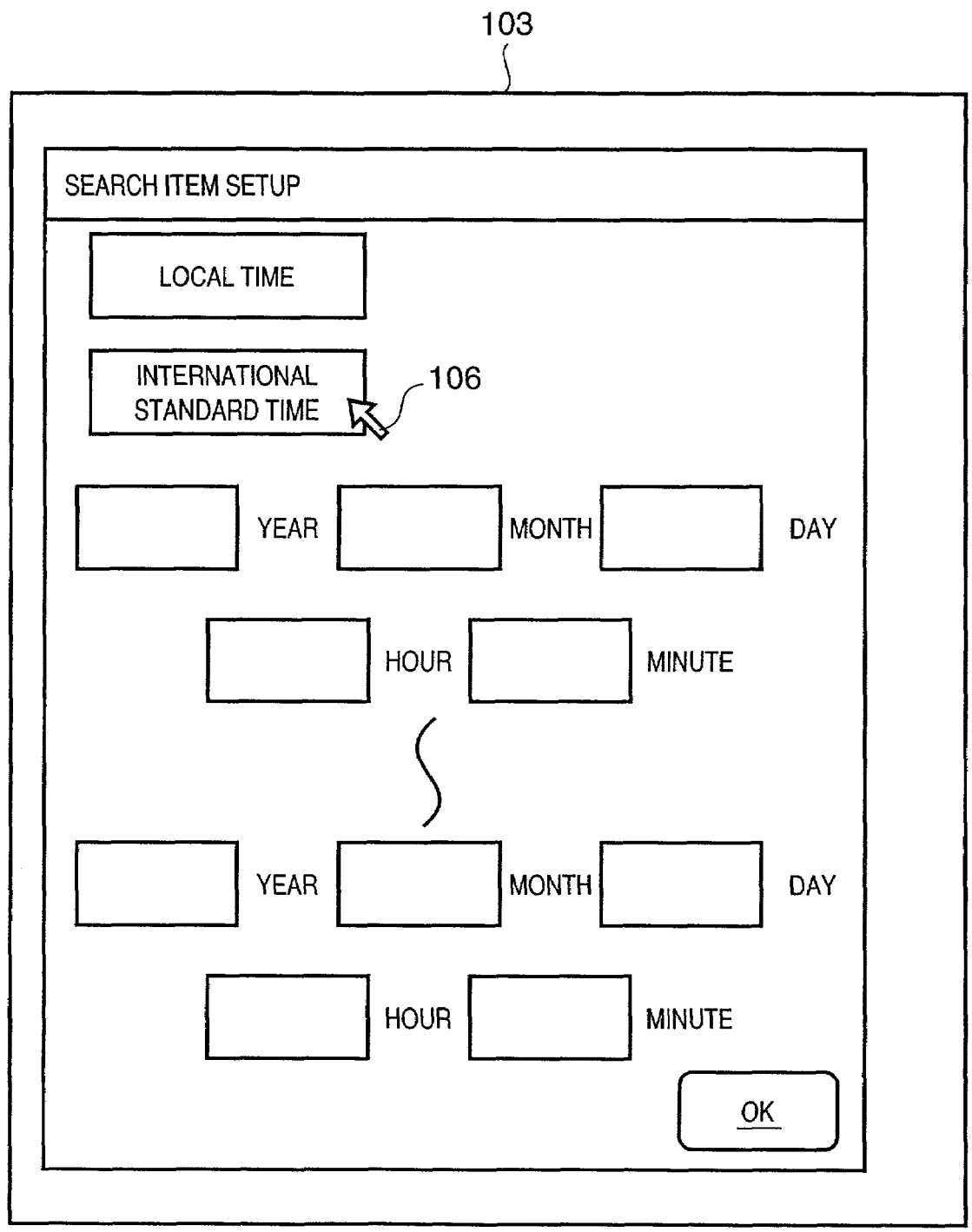
FIG. 16 shows an example of a search condition setup window.

FIG. 15 is a flow chart showing an example of the process of the search program 330. In step S1401, a search condition setup window is displayed on the display screen of the display device 103 to prompt the user to set a desired search condition using the keyboard 105, pointing device 106, and the like. As the search condition, a period defined by the local times, international standard times, or the like can be set. FIG. 16 shows an example of the search condition setup window. The search condition can be set like 10:00 to 12:00 (local time) on Nov. 1, 2000 or 10:00 to 12:00 (international standard time) on Nov. 1, 2000. As the search condition, the standard difference, season difference, file name, comment, other attributes (information size, information value, access frequency, and the like) of main information, and the like may be used in addition to the period defined by the local or international standard times (or duration).

Figure 17:
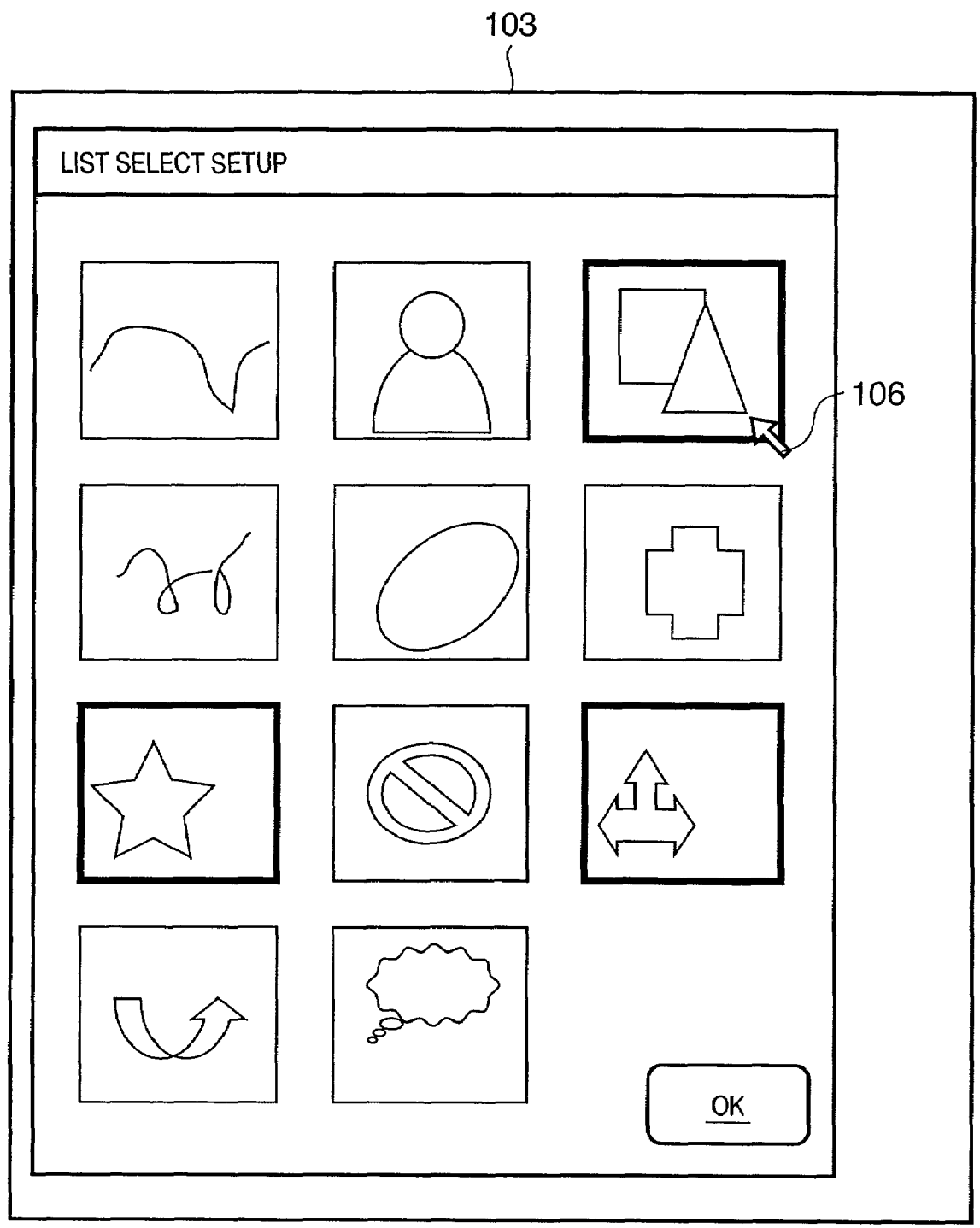
FIG. 17 shows an example of a select window used to prompt the user to select a desired image from stored information extracted in accordance with the search condition.

In step S1402, stored information which matches the search condition is extracted as retrieved data (340 to 34*n*). In this embodiment, the local or international standard time can be used as the search condition. Furthermore, the user may select a desired image from the extracted stored information. FIG. 17 shows an example of a select window that makes the user select a desired image from stored information extracted according to the search condition. In the example shown in FIG. 17, main information of stored information is an image.

The extracted stored information may be saved in, e.g., the memory medium 107*m*.

The information collection system 200 in the information management system of this embodiment can comprise the search program 330 in the information storage system 100' shown in FIG. 13 in addition to or in place of the select/display program 230.

According to this embodiment, in addition to the effects of the first or second embodiment, the following effects are obtained. That is, according to this embodiment, time information that directly or indirectly indicates a local time or international time need not be appended to a plurality of pieces of main information which form large-size data every time large-size data that must use data capture and the like is recorded or generated, and the time information can be simultaneously appended when such large-size data is stored in the information management system of this embodiment.

Application Example

The information management system according to each of the above embodiments is suitably used when images, documents, and the like are managed.

The information management method described in each of the above embodiments can be applied to manual filing. A case will be exemplified below wherein each of the above embodiments is applied to general document filing as an application example of the above embodiments.

Figure 21:
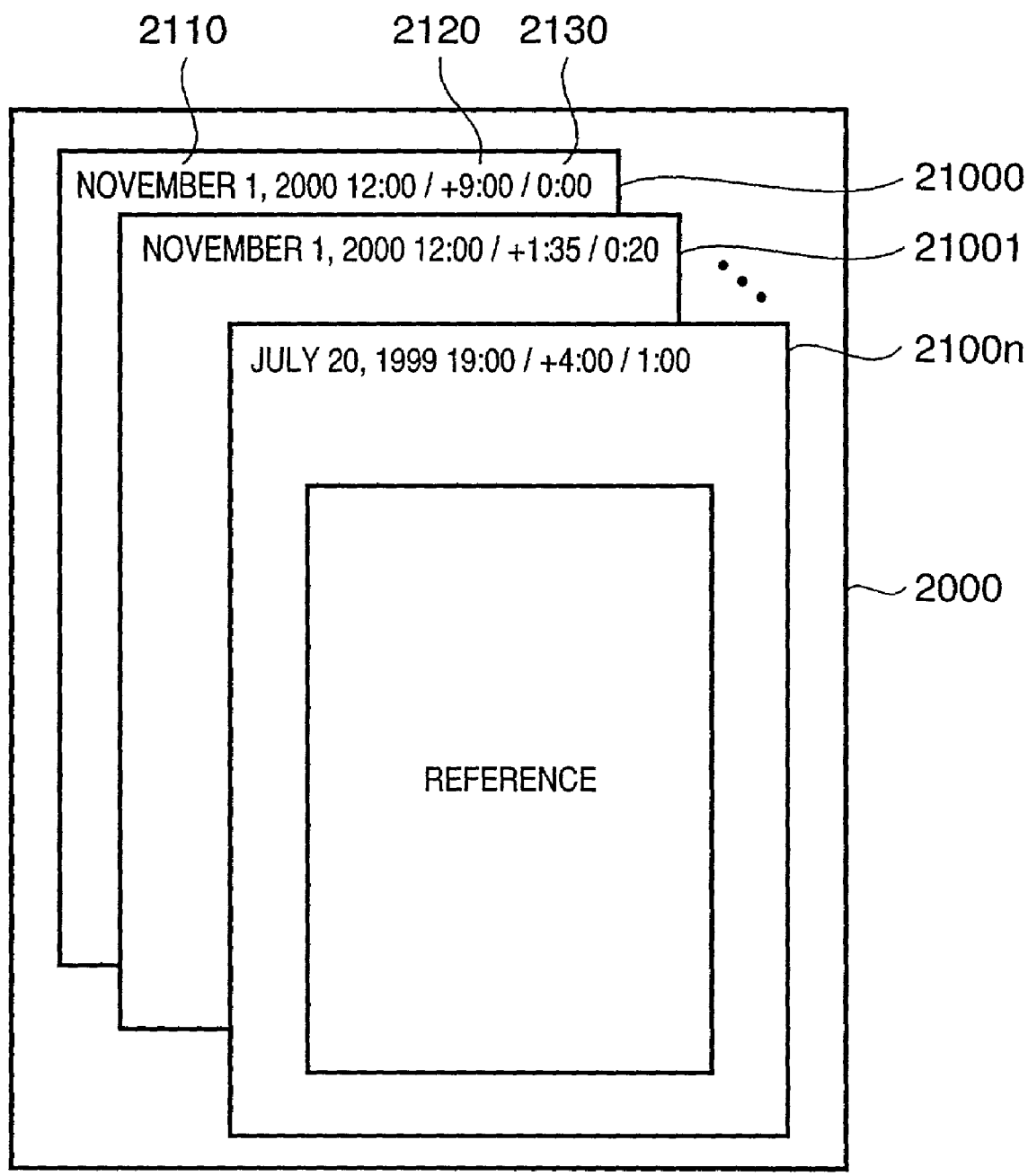
FIG. 21 shows an application example of an information management method.

In FIG. 21, a mark indicating a local time 2110, standard difference 2120, and season difference 2130 are appended to each document information (21000 to 2100*n*). The mark may be appended by recording it using various means (pen, pencil, print, and the like), or may be a label that records time information. According to this information management method, documents can be easily sorted based on the local time, and an international standard time can be calculated as needed.

In place of the local time 2110, a mark indicating an international standard time may be appended. In this case, the documents 21000 to 2100*n* can be easily sorted in the order of international standard times.

[Other]

The means for recording the time information on a document can be built in software that pertains to document creation or sending/receiving of e-mail messages, and image output apparatuses such as a facsimile apparatus, printer, copying machine, and the like.

All or some building components of software in each of the above embodiments may be replaced by hardware components, and all or some building components of hardware may be replaced by software components.

All or some building components of the apparatus and method according to the above embodiments can constitute the invention.

The apparatus and its building components in the above embodiments may be implemented as a part of another apparatus or in combination with another apparatus.

The functions of the above embodiments can also be achieved by supplying a program code of predetermined software to a system or apparatus via a storage medium (or recording medium) that records the program code or a network. The functions of the above embodiments can be implemented when a computer executes the program code stored in the storage medium or when an operating system (OS) or the like which is running on the computer executes some or all of actual processes on the basis of instructions of that program code. Furthermore, the functions of the above embodiments can be implemented when the program code is written in a memory equipped on a function extension card or unit inserted into or connected to the computer, and a CPU or the like mounted on that function extension card or unit executes some or all of actual processes on the basis of instructions of that program code.

According to the present invention, a technique for managing information in a format that can be used based on the international standard time and local time can be provided.

As many apparently widely different embodiments of the present invention can be made without departing from the spirit and scope thereof, it is to be understood that the invention is not limited to the specific embodiments thereof except as defined in the claims.

What is claimed is:

1. An information storage system that stores image for a user so that the user can retrieve the stored image comprising:
   an acquisition unit arranged to acquire the image along with a local time of a predetermined area where the image is acquired;
   a calculating unit arranged to calculate a standard difference between an international standard time and a standard time of the predetermined area, and a season difference between the standard time of the predetermined area and a local time of the predetermined area using a time library equipped in an operating system of the information storage system;
   a storage unit arranged to store the image acquired by said acquisition unit, wherein the storage unit appends to the image the local time of the predetermined area, the standard difference, and the season difference thereby enabling the international standard time when the image information was acquired to be determined; and an output unit arranged to output the image stored by said storage unit, wherein the output image is appended with the local time of the predetermined area, the standard difference, and the season difference.

2. The system according to claim 1, further comprising a saving unit arranged to save the image stored by said storage unit, wherein the saved image is appended with the local time, the standard difference, and the season difference in a removable memory medium.

3. The system according to claim 1, further comprising a search unit arranged to search the image stored by said storage unit for image which matches an arbitrary search condition.

4. The system according to claim 3, wherein said search unit includes a unit arranged to execute a search process for the image stored by said storage unit using the local time of the predetermined area as a key.

5. The system according to claim 3, wherein said search unit includes a unit arranged to execute a search process for the image stored by said storage unit using the international standard time as a key while calculating the international standard time on the basis of the local time of the predetermined area, the standard difference, and the season difference.

6. The system according to claim 3, further comprising an output unit arranged to output the retrieved by said search unit.

7. The system according to claim 3, further comprising a saving unit arranged to save the image retrieved by said search unit in a removable memory medium.

8. The system according to claim 1, further comprising a stored information manipulation unit arranged to manipulate the image information stored by said storage unit on the basis of the local time of the predetermined area appended to the image.

9. The system according to claim 8, wherein said stored information manipulation unit includes a unit arranged to sort the image information stored by said storage unit on the basis of the local time of the predetermined area.

10. The system according to claim 8, wherein said stored information manipulation unit includes a unit arranged to sort the image information stored by said storage unit on the basis of the international standard time.

11. The system according to claim 1, further comprising a stored information manipulation unit arranged to manipulate image information stored by said storage unit on the basis of the international standard time while calculating the international standard time on the basis of the local time of the predetermined area, the standard difference, and season difference appended to the image.

12. The system according to claim 1, wherein said acquisition unit includes a unit arranged to acquire information from a removable memory medium.

13. The system according to claim 1, wherein said acquisition unit includes a unit arranged to acquire the image from an external apparatus.

14. The system according to claim 13, wherein the external apparatus includes a camera.

15. An information storage system that stores image for a user so that the user can retrieve the stored image comprising:

an acquisition unit arranged to acquire the image along with a local time of a predetermined area where the image is acquired;

a calculating unit arranged to calculate a standard difference between an international standard time and a standard time of the predetermined area, and a season difference between the standard time of the predetermined area and a local time of the predetermined area using a time library equipped in an operating system of the information storage system;

a storage unit arranged to store the image acquired by said acquisition unit, wherein the storage unit appends to the image the international standard time, the standard difference, and the season difference, as supplemental information;

an output unit arranged to output the image stored by said storage unit, wherein the output image is appended with the international standard time, the standard difference, and the season difference.

16. An information management system that stores image for a user so that the user can retrieve the stored image comprising:

an information storage system; and
an information collection system,
said information storage system comprising:
an acquisition unit arranged to acquire the image along with a local time of a predetermined area where the image is acquired;

a calculating unit arranged to calculate a standard difference between an international standard time and a standard time of the predetermined area, and a season difference between the standard time of the predetermined area and a local time of the predetermined area using a time library equipped in an operating system of the information management system; and a storage unit arranged to store the image acquired by said acquisition unit, wherein the storage unit appends to the image the local time of the predetermined area, the standard difference, and the season difference, as supplement information thereby enabling the international standard time when the image was acquired to be determined, an output unit arranged to output the image stored by said storage unit, wherein the output image is appended with the local time of the predetermined area, the standard difference, and the season difference, and said information collection system comprising a collection/storage unit arranged to collect and store the image stored by said storage unit of said information storage system from said information storage system.

17. The system according to claim 16, wherein said information collection system further comprises a collected information search unit arranged to search the image collected and stored by said collection unit for image which matches an arbitrary search condition.

18. The system according to claim 17, wherein said collected information search unit includes a unit arranged to execute a search process for the image collected and stored by said collection unit using the local time of the predetermined area as a key.

19. The system according to claim 17, wherein said collected information search unit includes a unit arranged to execute a search process for the image collected and stored by said collection unit using the international standard time as a key while calculating the international standard time on the basis of the local time of the predetermined area, the standard difference, and the season difference.

20. The system according to claim 17, wherein said information collection system further comprises a unit arranged to save the image retrieved by said collected information search unit in a removable memory medium.

21. The system according to claim 16, wherein said information collection system further comprises a collected information manipulation unit arranged to manipulate the image collected and stored by said collection/storage unit on the basis of the local time of the predetermined area appended to the image.

22. The system according to claim 21, wherein said collected information manipulation unit includes a unit arranged to sort the image information collected and stored by said collection/storage unit on the basis of the local time of the predetermined area.

23. The system according to claim 16, wherein said information collection system further comprises a collected information manipulation unit arranged to manipulate the image information collected and stored by said collection/storage unit on the basis of the international standard time while calculating the international standard time on the basis of the local time of the predetermined area, the standard difference, and season difference appended to the image.

24. The system according to claim 23, wherein said collected information manipulation unit includes a unit arranged to sort the image information collected and stored by said collection/storage unit on the basis of the international standard time.

25. The system according to claim 16, further comprising a plurality of information storage systems equivalent to said information storage system, and wherein said collection/storage unit of said information collection system collects and stores image stored by the respective storage units of said plurality of information storage systems.

26. An information management system that stores image for a user so that the user can retrieve the stored image comprising:
an information storage system; and
an information collection system,
said information storage system comprising:
an acquisition unit arranged to acquire image along with a local time of a predetermined area where the image is acquired;
a calculating unit arranged to calculate a standard difference between an international standard time and a standard time of the predetermined area, and a season difference between the standard time and local time of the predetermined area using a time library equipped in an operating system of the information management system;
a storage unit arranged to store the image acquired by said acquisition unit, wherein the storage unit appends to the image the international standard time, the standard difference, and the season difference, and
an output unit arranged to output the image stored by said storage unit, wherein the output image is appended with the international standard time, the standard difference, and the season difference,
wherein said information collection system comprising a collection/storage unit arranged to collect and store image stored by said storage unit of said information storage system from said information storage system, as supplemental information.

27. An information storage method that enables a user to retrieve stored image from an information storage system comprising:
acquiring the image along with a local time of a predetermined area where the image is acquired;
calculating a standard difference between an international standard time and a standard time of the predetermined area, and a season difference between the standard time and local time of the predetermined area using a time library equipped in an operating system of the information storage system;
storing the image acquired in the acquiring step with appending, to the image, the local time of the predetermined area, the standard difference, and the season difference, as supplemental information thereby enabling the international standard time when the was was acquired to be determined; and
outputting the image stored by said storing, wherein the output image is appended with the local time of the predetermined area, the standard difference and the season difference.

28. An information storage method that enables a user to retrieve stored image from an information storage system comprising:
acquiring the image along with a local time of a predetermined area where the image is acquired;
calculating a standard difference between an international standard time and a standard time of the predetermined area, and a season difference between the standard time and local time of the predetermined area using a time library equipped in an op erating system of the information storage system;
storing the image acquired in the acquiring step with appending, to the image, the international standard time, the standard difference, and the season difference, as supplemental information; and
outputting the image stored by said storing, wherein the output image is appended with the international standard time, the standard difference, and the season difference.

29. An information management method that enables a user to retrieve stored image from an information storage system comprising the steps of:
making each of a plurality of information storage systems acquire image along with a local time of a predetermined area where the image is acquired, calculate a standard difference between an international standard time and a standard time of the predetermined area as well as a season difference between the standard time of the predetermined area and a local time of the predetermined area using a time library equipped in an operating system of the information storage system, store the acquired image with appending, to the image, the local time of the predetermined area, the standard difference, and the season difference, as supplemental information thereby enabling the international standard time when the image was acquired to be determined; and output the image stored by a storage unit wherein the output image is appended with the local time of the predetermined area, the standard difference and the season difference, and
making an information collection system collect and store the image stored by the plurality of information storage systems.

30. An information management method that enables a user to retrieve stored image from an information storage system comprising the steps of:
making each of a plurality of information storage systems acquire image along with a local time of a predetermined area where the image is acquired, calculate a standard difference between an international standard time and a standard time of the predetermined area as well as a season difference between the standard time of the predetermined area and a local time of the predetermined area using a time library equipped in an operating system of the information storage system, and store the acquired image with appending, to the image, the international standard time, the standard difference, and the season difference, as supplemental information, and output the image stored by a storage unit wherein the output image is appended with the international standard time, the standard difference and the season difference; and making an information collection system collect and store the image stored by the plurality of information storage systems.

31. An information management method that enables a user to retrieve stored image from an information storage system comprising the steps of:

acquiring the image along with a local time of a predetermined area where the image is acquired;

calculating a standard difference between an international standard time and a standard time of the predetermined area, and a season difference between the standard time of the predetermined area and a local time of the predetermined area using a time library equipped in an operating system of the information storage system; and appending, to the image to be managed, the local time of the predetermined area, the standard difference, and the season difference;

managing the image appended with the local time of the predetermined area, the standard difference, and the season difference on the basis of the local time of the predetermined area, the standard difference, and the season difference, as supplemental information thereby enabling the international standard time when the image was acquired to be determined; and outputting the image stored by a storage unit, wherein the output image is appended with the local time of the predetermined area, the standard difference and the season difference.

32. An information management method that enables a user to retrieve stored image from an information storage system comprising the steps of:

acquiring the image along with a local time of a predetermined area where the image is acquired;

calculating a standard difference between an international standard time and a standard time of the predetermined area, and a season difference between the standard time and local time of the predetermined area using a time library equipped in an operating system of the information storage system; and appending, to image to be managed, the international standard time, the standard difference, and the season difference, as supplemental information;

managing the information appended with the international standard time, the standard difference, and the season difference on the basis of the international standard time, the standard difference, and the season difference; and outputting the image stored by a storage unit, wherein the output image is appended with the international standard time, the standard difference, and the season difference.

33. An information storage system that enables a user to retrieve stored image comprising:

an acquisition unit configured to acquire the image along with a local time of a predetermined area where the image is acquired;

a calculating unit arranged to calculate a standard difference between an international standard time and a standard time of the predetermined area, and a season difference between the standard time of the predetermined area and a local time of the predetermined area using a time library equipped in an operating system of the information storage system;

a first storage unit configured to associate the image with the local time of the predetermined area and store the image with the local time of the predetermined area;

a second storage unit configured to download the image with the local time of the predetermined area from said first storage unit and store the image with an international standard time; and an output unit configured to output the image stored by the first and second storage units, wherein the output image is appended with the local time of the predetermined area, the standard difference and the season difference, wherein the international standard time is obtained based on the local time of the predetermined area the standard difference and the season difference.

34. The information storage system of claim 33, wherein the standard difference is a difference between an international standard time and the standard time of the predetermined area.

35. The information storage system of claim 33, wherein the season difference is a difference between the standard time of the predetermined area and the local time of the predetermined area.

36. An information storage method that enables a user to retrieve stored image from an information storage system comprising:

acquiring image along with a local time of a predetermined area where the image is acquired;

calculating a standard difference between an international standard time and a standard time of the predetermined area, and a season difference between the standard time of the predetermined area and a local time of the predetermined area using a time library equipped in an operating system of the information storage system;

associating the image with the local time of the predetermined area and store the image with the local time of the predetermined area;

downloading the image with the local time of the predetermined area from said first storage unit and store the image with an international standard time; and outputting the image stored by a storage unit, wherein the output image is appended with the local time of the predetermined area, the standard difference and the season difference, wherein the international standard time is obtained based on the local time of the predetermined area the standard difference and the season difference of the predetermined area.

37. The information storage method of claim 36, wherein the standard difference is a difference between an international standard time and the standard time of the predetermined area.

38. The information storage method of claim 36, wherein the season difference is a difference between the standard time of the predetermined area and the local time of the predetermined area.

* * * * *

UNITED STATES PATENT AND TRADEMARK OFFICE
CERTIFICATE OF CORRECTION

| | | |
|---|---|---|
| PATENT NO. | : 7,225,203 B2 | Page 1 of 1 |
| APPLICATION NO. | : 10/117635 | |
| DATED | : May 29, 2007 | |
| INVENTOR(S) | : Kohno | |

It is certified that error appears in the above-identified patent and that said Letters Patent is hereby corrected as shown below:

In Claim 28 (col. 18, line 26), please replace "op erating" with --operating--.

Signed and Sealed this

Seventh Day of August, 2007

JON W. DUDAS
*Director of the United States Patent and Trademark Office*